(12) United States Patent
Blakkan

(10) Patent No.: US 10,915,095 B2
(45) Date of Patent: Feb. 9, 2021

(54) SYSTEMS AND METHODS FOR DYNAMIC GROUPS IN CONTROL SYSTEMS

(71) Applicant: Brentt Blakkan, San Francisco, CA (US)

(72) Inventor: Brentt Blakkan, San Francisco, CA (US)

(*) Notice: Subject to any disclaimer, the term of this patent is extended or adjusted under 35 U.S.C. 154(b) by 156 days.

(21) Appl. No.: 15/815,592

(22) Filed: Nov. 16, 2017

(65) Prior Publication Data

US 2018/0136638 A1   May 17, 2018

Related U.S. Application Data

(60) Provisional application No. 62/422,768, filed on Nov. 16, 2016.

(51) Int. Cl.
*G05B 19/418* (2006.01)

(52) U.S. Cl.
CPC ............. *G05B 19/41835* (2013.01); *G05B 2219/31449* (2013.01)

(58) Field of Classification Search
CPC .............................................. G05B 19/41835
USPC ....................................................... 700/275
See application file for complete search history.

(56) References Cited

U.S. PATENT DOCUMENTS

| | | | |
|---|---|---|---|
| 9,597,567 B1* | 3/2017 | Tran ..................... | A63B 60/46 |
| 2015/0120000 A1* | 4/2015 | Coffey ................ | H04L 12/2803 |
| | | | 700/13 |
| 2016/0099815 A1* | 4/2016 | Park ..................... | H04W 4/70 |
| | | | 370/254 |
| 2016/0261425 A1* | 9/2016 | Horton .................. | G05B 15/02 |
| 2018/0279429 A1* | 9/2018 | Sadwick ............... | H05B 33/08 |

* cited by examiner

*Primary Examiner* — David T Welch
(74) *Attorney, Agent, or Firm* — WHS Law Firm

(57) ABSTRACT

Technology is disclosed for controlling accessories with dynamic groups in control systems (the "technology"). A dynamic group is first created as a copy of a user's predefined group of control elements. Dynamic groups allow for nondestructive subgroupings to be made on-the-fly without changing predefined groups. This duplication of groups is significant since predefined groups continue to be useful beyond the lifespan of groupings temporarily created for a specific situation. Also, the coexistence of a dynamic group and its predefined counterpart naturally leads to a new concept called equilibrium, which defines the 'natural state of rest' for the dynamic group as mirroring the predefined group. Imparting a control system with knowledge of equilibrium allows for users to instantly revert a dynamic group to its original predefined state.

6 Claims, 14 Drawing Sheets

SYSTEMS AND METHODS FOR DYNAMIC GROUPS IN CONTROL SYSTEMS

FIELD OF THE DISCLOSURE

The disclosure relates to control systems for computing systems, computing devices and objects with embedded computing devices.

BACKGROUND

Control systems manage, command, direct and regulate the behavior of other devices or systems from a residence's thermostat to a system that controls an industrial complex. The Internet of Things is a perfect example. The Internet of Things ("IoT")—that is the interconnection via the Internet of computing devices embedded in everyday objects, enabling them to send and receive data—has transformed people's lives. IoT enables, among other things, today's smart homes and connected cars. Clocks, speakers, lights, door bells, cameras, windows, window blinds, hot water heaters, appliances, cooking utensils, etc. can now all send information and receive commands. Smart homes, e.g., allow people to control objects—from lights, window shades and pet feeders to stereos, locks and security systems—by simply interacting with a control system's user interface.

As these systems become more pervasive and as they control an ever-growing plethora of IoT devices, the complexity of using control systems increases. Control systems for controlling lights in homes serve as a good illustration. Current control system applications for lights include Marcel Dittmann's emblazee, Elgato Systems' Elgato Eve, Apple Inc.'s Home, Mattias Hochgatterer's Home, Smartlab's Insteon+, Fernando Toledo Guerrero's Huemote, and Philips Lighting BV's Philips Hue.

Control systems for lights rely heavily on predefined groups in the form of rooms, homes and zones. Predefined groups capture physical groupings which maintain their significance beyond the lifespan of any situation. Predefined groups are inherently problematic because they are set up in advance of using the interface, and do not take into account temporary, situational requirements. It is useful to control lights based on their unchanging physical relationships (e.g., the lights in a bedroom). However, predefined groups are inflexible when you want to temporarily control lights in a different grouping (e.g., lights in the kitchen, dining room and living room for a party). To handle such a situation, predefined groups require users to (a) control each room separately, (b) create a new predefined group that may never be used again, or (c) modify existing predefine groups to match their temporary needs and subsequently restore them. Modifying predefined groups destroys meaningful information that a user provided to the system. And all these options require unnecessary time and effort.

Another approach, zones, attempts to make multiple predefined groups, such as rooms, easier to control. Zones allow physical groupings from the real world that do not change (e.g., all lights upstairs). Zones do not allow for temporary groupings that users might want to control (e.g., all blue lights during a party). Zones also do not allow for controlling lights based on their characteristics (e.g., color, brightness or on/off state). Because they are in effect predefined groups of groups, predefined zones suffer from the same issues.

Yet another approach is augmenting predefined groups by defining subgroups based on a characteristic, such as a light's hue. Users might define a subgroup of lights that will emit a blue hue. These subgroups are nondestructive to their underlying, predefined group. The problem is that these subgroups conflate groups and characteristics. By defining a subgroup of lights, users are forced to merge their characteristics to the same value. This is less than ideal if a user simply wants to decrease the brightness of a hypothetical subgroup without merging its color.

Predefined groups also create navigational issues. Users are presented with all lights in a given predefined group, irrelevant of their characteristics or availability. Lights are not intelligently removed from a presentation in two important instances. Lights continue to be presented despite either being unavailable (no connection to the system) or having been recently turned off by the user. Ideally, unavailable or unwanted lights would be removed and only presented again to the user when available or explicitly turned on. Furthermore, navigating predefined groups often involves traversing up and down a hierarchy from a home to individual accessories in the home, and back again. This form of navigation is inefficient and tiring to users. An unsatisfactory alternative is modes, where users switch from a presentation of groups to a presentation of a characteristic (a mode), such as brightness. To adjust the brightness of a subgroup of lights, a user must switch modes to view all the lights in system. This switch is confusing, cumbersome and unnecessary.

Finally, existing control systems are flawed in that they lack parity between individual lights and groups. The primary purpose of a control system is to controlling objects at both the individual and group levels. Turning a group of lights "ON", e.g., should be just as easy as turning a single light "ON". When a system lacks parity across levels of its hierarchy, users must make concessions in how to achieve their goals. If the interface lacks the desired controls at the group level, users must navigate to each light's controls and must redundantly set the same state for each. On the other hand, if a system splits controls for groups and individuals into separate modes, users cannot control individual lights from the group mode, and vice versa. These control restrictions are arbitrary limitations. They leave the user confused and frustrated.

Therefore, what is needed are dynamic groups for control systems that enable users to easily and efficiently create situational, temporary groupings without altering existing, or creating unnecessary, predefined groups, and that allow modification of available characteristics by control element and/or group and from any level of the grouping hierarchy.

SUMMARY

Technology is disclosed for controlling accessories with dynamic groups in control systems (the "technology"). A dynamic group is first created as a copy of a user's predefined group of control elements. Dynamic groups allow for nondestructive subgroupings to be made on-the-fly without changing predefined groups. This duplication of groups is significant since predefined groups continue to be useful beyond the lifespan of groupings temporarily created for a specific situation. Also, the coexistence of a dynamic group and its predefined counterpart naturally leads to a new concept called equilibrium, which defines the 'natural state of rest' for the dynamic group as mirroring the predefined group. Imparting a control system with knowledge of equilibrium allows for users to instantly revert a dynamic group to its original predefined state.

In combination with dynamic groups and equilibrium, the technology uses the concept of grouping hierarchy and its associated levels. Groups, predefined and dynamic, exist in a hierarchy. That is to say, users can define groups that contain, or are contained by, other groups. The location of a group in a grouping hierarchy level (above, below or at the same level) is relative to other groups in the control system.

Dynamic groups and grouping hierarchy level determine presentation throughout the control system's user interface. Control elements—an accessory or a group of accessories being controlled by the user—are only presented for current members of the dynamic group, obviating the clutter inherent to leaving both grouped and ungrouped elements on screen. Furthermore, all control elements appear and function identically, since presentation is only a function of dynamic groups and grouping hierarchy level. This means that a control element representing a group of accessories affords the same control over characteristics as a control element representing a single accessory. This allows for quick and intuitive control at each level of the grouping hierarchy.

In order to modify dynamic groups, the technology uses subtraction, addition and accessory-driven methods. If a user or the control system requests a specific control element to be ungrouped, the subtraction method removes elements from a dynamic group and, optionally, triggers a navigation event that presents a different grouping hierarchy level. Likewise, the addition method incrementally restores dynamic groups back to equilibrium. The addition method may also determine whether to restore the currently presented group to equilibrium, or to trigger a navigation event that presents a different grouping hierarchy level.

While the subtraction and addition methods can be invoked explicit, the accessory-driven grouping method allows changes of to an accessory's state (e.g., availability to the network or power to the accessory) to implicitly drive subtraction or addition events. The link between an accessory's state and its dynamic group predicts and encodes user intent, leveraging accessory state changes to create and present useful, dynamic groups to a user. The technology however does not allow for grouping to implicitly drive changes to accessories' characteristics. There is parity of control across all levels of the grouping hierarchy. Users can control the same characteristics for every presented control element. This control parity allows users to control an accessory or a group of accessories in an identical manner. Grouping or ungrouping accessories does not force those accessories to share the same characteristic.

BRIEF DESCRIPTION OF THE DRAWINGS

The drawings described herein are for illustrative purposes only of selected embodiments and not all possible implementations and are not intended to limit the scope of the present disclosure.

DEFINITIONS

Figure 1:
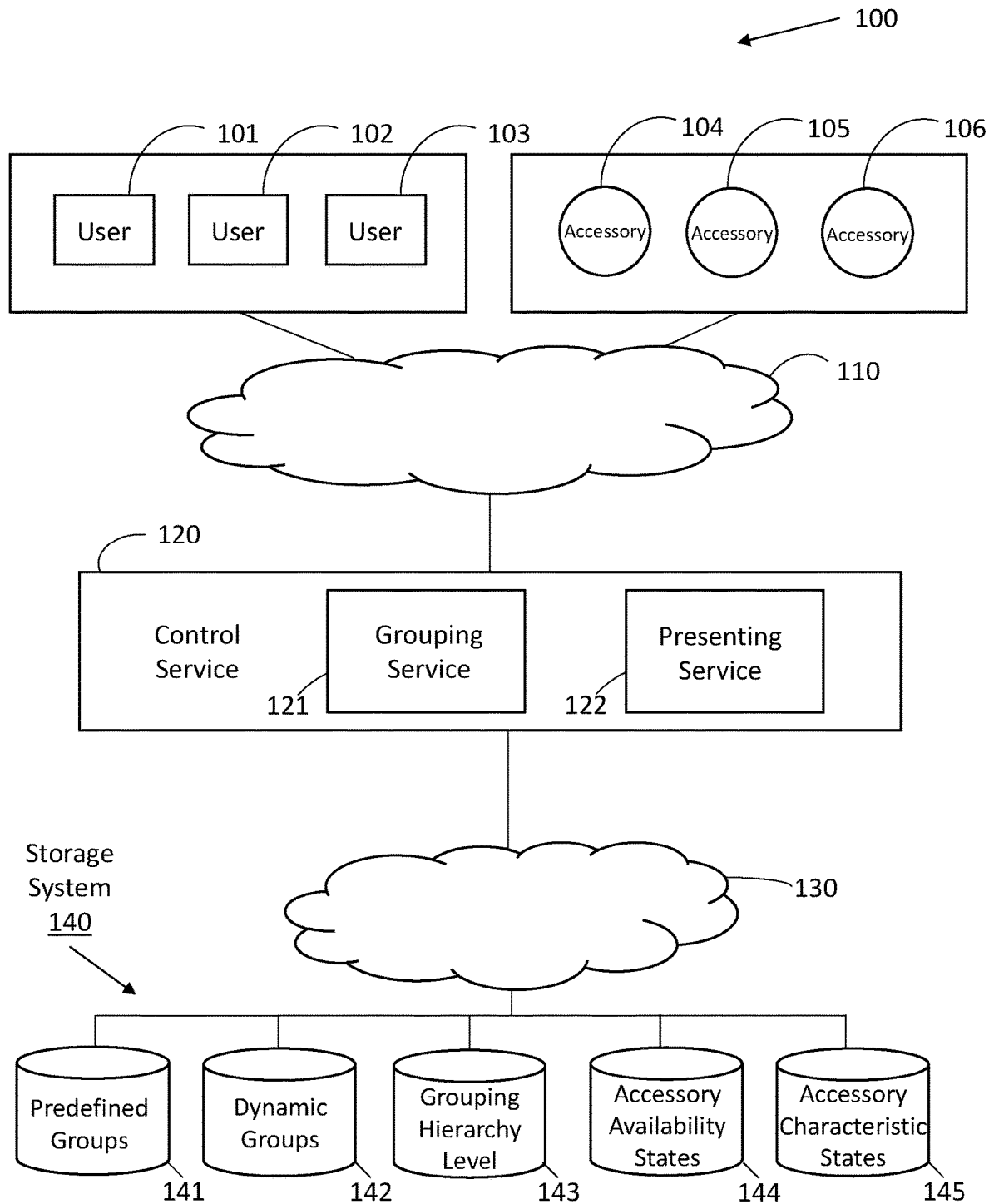
FIG. 1 is a block diagram illustrating an environment in which the technology may operate in various embodiments.

Accessory: a physical device (e.g., a lightbulb, audio speaker or water fountain nozzle) with an embedded computing device that allows for one or more characteristics of the physical device to be modified by a control system.

Availability: an accessory's state defining whether or not the control system is currently able to control the accessory ("available") or is currently unable to control the accessory ("unavailable"). E.g., an accessory may be unavailable if it is not currently connected to power or to a network.

Characteristic: an aspect of an accessory that defines the accessory's function in terms of values it receives as inputs and it sends as outputs. E.g., consistent with various embodiments, an accessory's characteristics may include brightness, volume or flow capacity.

Control System: a logical abstraction for controlling accessories using a computer system. Accessories and their characteristics map into the control system as control elements.

Control Element: a user interface component of a control system that provides users the ability to modify characteristics of accessories. Control elements may consist of a single accessory or for a group of accessories. Characteristics may then be modified for an accessory or a group. E.g., consistent with various embodiments, a control element may be a bedroom light, or all light bulbs in a bedroom.

Group: a grouping of control elements.

Predefined Group: a grouping of control elements that is explicitly entered (defined) by users of a control system, generally in advance of controlling accessories. Users often map unchanging physical groups in the world to correlate to pre-defined groups. E.g., consistent with various embodiments, rooms in a home might be predefined by users as room groups in a control system, such as "Living Room", "Kitchen", "Family Room", "Office" and "Bedroom".

Dynamic Group: a grouping of control elements that is initially created as a copy of a predefined group. Dynamic groups are intended to be modified by users, such as adding and removing control elements and changing characteristics' values.

Equilibrium: a dynamic group's state which indicates that the current control elements of the dynamic group are identical to the control elements of the predefined group from which it was initially created, excluding unavailable accessories. Being far from equilibrium means a significant number of a dynamic group's control elements have been removed, rendering it a small subset of its source, predefined group.

Grouping Hierarchy Level: a location of a control element (above, below or at the same level) relative to other control elements. The location is defined by the control elements it contains, and/or by the control elements in which it is contained. For example, consistent with various embodiments, a home group may contain room groups, which themselves may contain accessories. In this example, the home group's hierarchy level is above the room groups' levels, the accessories are below. The individual room groups are at the same hierarchy level.

Parent Group: a group containing one or more control elements.

Child Group: a control element contained within another group.

Presentation: the set of control elements that are presented to the user at a given point in time, which are able to be controlled independently or, optionally, as a group.

DETAILED DESCRIPTION

Environment for Dynamic Groups in a Control System

Technology is disclosed for providing dynamic groups in a control system (the "technology"). Several embodiments of the technology are described in more detail in reference to the figures. Turning to FIG. 1, FIG. 1 is a block diagram illustrating an environment 100 in which the technology may operate in various embodiments. The environment 100 includes a control service 120 that provides a set of services, including services such as a grouping service 121 and a presenting service 122 to a set of users, e.g., user 101, user 102 and user 103. The set of users may access the control service 120 via a communication network 110. Further, the set of users may access the control service 120 using a variety of devices, including a desktop, a laptop, a smart phone, or a tablet PC.

In various embodiments, control service 120 maintains a logical abstraction of physical devices with embedded computing devices ("accessories") for the purpose of controlling those accessories. Control service 120 groups and presents accessories, such as accessory 104, accessory 105 and accessory 106, in control elements. Control elements may consist of a single accessory or a grouping of accessories (a "group"). Control elements allow users, such as users 101, 102 and 103, to modify characteristics of an accessory or of a group. Characteristics of an accessory associate values with that accessory's functions. Control service 120 may access accessories via a communication network 110. Further details regarding users, control elements and accessories are described with reference to at least FIGS. 2 and 8-14.

Referring back to FIG. 1, consistent with various embodiments, grouping service 121 allows users, such as users 101, 102 and 103, to group control elements in predefined groups. Predefined groups are explicitly entered by users, generally in advance of controlling accessories. Predefined groups often capture meaningful and unchanging physical groupings. Grouping service 121 defines dynamic groups, which are initially created as copies of their respective, predefined groups. Dynamic groups are intended to be modified by users, such as adding control elements, removing control elements and changing characteristics of accessories. Dynamic groups allow users to create temporary subgroups of control elements without modifying the predefined groups, which maintains those groups' usefulness after a user's situational needs are no longer required.

In various environments, grouping service 121 creates and maintains a grouping hierarchy level. A grouping hierarch level is the location of a control element relative to the other control elements. A control element may be above, below, or at the same level of other control elements. A control element's grouping hierarchy level is therefore defined by control elements it contains, and/or by the control elements in which it is contained. For example, consistent with various embodiments, a home group may contain room groups, which themselves may contain control elements of individual accessories (lights). In this example, the home group's hierarchy level is above the room group's level. The room group's level is above the accessories level. The accessories are at the same hierarchy level. The home and room groups are parent groups (groups containing other control elements). The room group and its accessories are child groups (control elements contained within another group). Further details regarding grouping service 121 are described with reference to at least FIGS. 2, and 8-14.

Referring back to FIG. 1, consistent with various embodiments, presenting service 122 presents control elements to users, such as users 101, 102 and 103. A set of control elements are presented to users at a given point in time. The control elements in that presentation are able to be controlled independently or as a group. In some embodiments, an accessory's availability determines whether or not it is presented in a control element to a user. If an accessory is unavailable to the control service 120, presenting service may not present that accessory. An accessory may be unavailable if, e.g., it is not currently connected to power or to a network. Control elements may be presented or accessed using a variety of devices regardless of a platform of the devices. In some embodiments, users may be presented, or may access, the control service 120 using a web browser or a control system application installed on a device. Further details regarding presenting service 122 are described with reference to at least FIGS. 2, and 8-14.

Referring back to FIG. 1, control service 120 stores grouping and accessory information and presents control elements to users, consistent with various embodiments. The grouping and accessory information and control elements may be configured to be stored in storage system 140 accessible via a communication network 130. Storage system 130 stores predefined groups, dynamic groups, control elements, and accessories and their associated availability and characteristics. Storage system 140 may include a set of databases, such as predefined groups 141, dynamic groups 142, grouping hierarchy level 143, accessory availability states 144 and accessory characteristic states 145. In various embodiments, storage system 140 may be configured as a cloud storage system that may be distributed among different geographical locations. The groups and control elements associated with a particular accessory may be stored in the same database of storage system 140 or different databases of storage system 140. Further, storage system 140 may be set up separate from control service 125, for example, on different machines, different geographical locations, etc.

Figure 2:
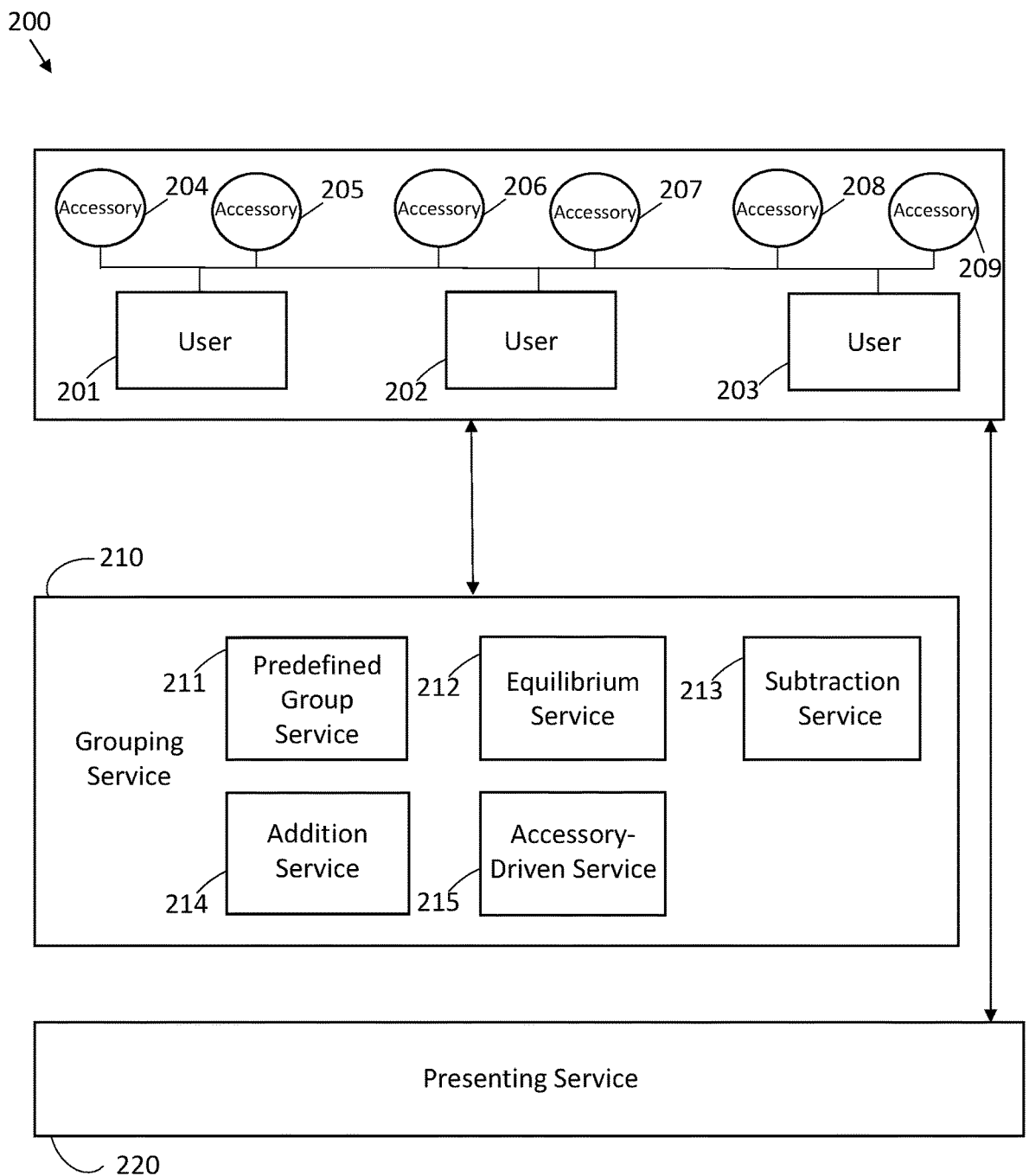
FIG. 2 is a block diagram illustrating an environment for providing a grouping service and a presenting service, consistent with various embodiments.

Turning now to FIG. 2, FIG. 2 is a block diagram, consistent with various embodiments, illustrating an environment 200 for the control service of FIG. 1. Grouping service 210 of environment 200 may be similar to grouping service 121 of FIG. 1. Presenting service 220 of environment 200 may be similar to presenting service 122 of FIG. 1. Users 201, 202 and 203 of environment 200 may be similar to users 101, 102 and 103 of FIG. 1. Accessories 204, 205, 206, 207, 208 and 209 may be similar to accessories 104, 105 and 106 of FIG. 1. In various embodiments, grouping service 210 includes a predefined group service 211, equilibrium service 212, subtraction service 213, addition service 214 and an accessory-driven service 215.

Predefined Group Service

Predefined group service 211 allows users, such as users 201, 202 and 203, to create groupings of accessories, such as accessories 204, 205, 206, 207, 208 and 209, consistent with various embodiments. For example, accessories 204 and 205 may be lights in a kitchen, accessory 206 may be the dining room light, accessories 207 and 208 may be lights in an office, and accessory 209 may be the bedroom light; all in a user's home. Users may create a predefined 'kitchen' group with accessories 204 and 205, a 'dining room' group with accessory 206, an 'office' group with accessories 207 and 208, and a 'bedroom' group with accessory 209.

Predefined group service 211 allows users to create hierarchies of groups, including group hierarchy levels, consistent with various embodiments. For example, users may create a predefined 'home' group which contains the above kitchen, dining room, office and bedroom groups (the "room groups"). In this example home group is a parent group to the room groups. The room groups are child groups. Home group is above the room groups in the grouping hierarchy level. The room groups are below home group and are above their accessories.

Equilibrium Service

Turning back to FIG. 2, equilibrium service 212 sets equilibrium states for dynamic groups, consistent with various embodiments. Dynamic groups alleviate the issues caused by predefined groups in existing control systems while preserving the benefits of predefined groups (e.g., encoding and preserving real-world information about accessories). Dynamic groups provide users several grouping dimensions simultaneously, rather than requiring users to deconstruct predefined groups or to create alternative predefined groups. Dynamic groups enable the user to create novel groups on-the-fly without predefining those groups themselves. Dynamic groups are the groups presented to, and modified by, users. Predefined groups function as templates.

Equilibrium service 212 sets equilibrium states for dynamic groups by retrieving predefined groups and excluding any accessories that are unavailable, consistent with various embodiments. Dynamic groups start as identical pairs that mirror the structure of their respective predefined groups at each level of the grouping hierarchy, e.g., at both the home and room levels. A dynamic group is initially in equilibrium with its predefined group. Equilibrium is a dynamic group's state which indicates that the current control elements of the dynamic group are identical to the control elements of the predefined group. Dynamic groups exist alongside their predefined group counterparts. User modifications of these groups do not alter the predefined groups. Dynamic groups exist purely for nondestructive subgrouping. This can take the form of explicit subgroupings driven by users, or implicit subgrouping by the control system.

Equilibrium service 212 sets dynamic groups to equilibrium with their underlying predefined groups after the dynamic groups have been modified, consistent with various embodiments. Imparting the control system with knowledge of equilibrium allows users to instantly revert a dynamic group to the structure of its original, predefined state. This obviates the need for users to manually manage grouping states and to reverse temporary changes. This duplication of groups is invaluable since predefined groups remain unchanged and continue to be useful beyond the situation for which dynamic groups were modified.

Modifying Dynamic Groups

Dynamic groups are modified by subtraction and addition, consistent with various embodiments. Dynamic groups start at equilibrium, that is to say, as a complete copy of a predefined group. Modifying dynamic groups, at least initially, is a subtractive process. Users are essentially subtracting control elements of a predefined group one control element at a time to meet their needs. Subtracting a dynamic group's control elements is therefore granular—one control element at a time. Adding control elements to a dynamic group is adding back subtracted control elements. Addition takes advantage of equilibrium. Granularity is not required when restoring equilibrium. Restoring equilibrium (adding back all subtracted control elements) can be initiated by a single user request. As discussed in more detail below, subtraction and addition can be either explicitly requested by a user, or implicitly requested by the control system as a result of changes to an accessory's characteristic or availability state.

Subtraction Service

Turning back to FIG. 2, subtraction service 213 subtracts control elements from dynamic groups at a user's or the control system's request, consistent with various embodiments. In current control systems, controlling some—but not all—control elements in a predefined group is unnecessarily difficult. Users are not able to temporarily exclude control elements from an existing group. Users must create a new predefined group, control element by control element, containing only the control elements they wish to control. In contrast, dynamic groups offer a subtractive-style of temporary subgrouping. Rather than creating a predefined group for a given situation, users can subtract control elements and later restore the dynamic group to equilibrium.

Subtraction service 213 is initiated by a request to subtract a control element from its dynamic group, consistent with various embodiments. Subtraction service 213 retrieves the dynamic group and determines whether there are any remaining control elements in the dynamic group after subtracting the requested element. If there are remaining control elements in the dynamic group, the requested control element is subtracted from the dynamic group, the modified dynamic group is stored, and presenting service 220 presents the modified dynamic group to users.

If there are no remaining control elements in the dynamic group, the dynamic group is now 'empty'. Subtraction service 213 determines whether or not the empty dynamic group was at the highest group hierarchy level. If not at the highest level, the empty dynamic group is subtracted from its parent group, and presenting service 220 presents the modified parent group to users. This is a key, novel feature of subtraction—propagating changes to the presented, grouping hierarchy level. If the empty dynamic group was at the highest group hierarchy level, presenting service 220 presents the highest group hierarchy level in its equilibrium state to users. In either case, subtraction service 213 requests equilibrium service 212 to set equilibrium for the empty dynamic group. This step is for control system's purposes only and is unrelated to presentation.

Addition Service

Turning back to FIG. 2, addition service 214 adds control elements to dynamic groups at a user's or the control system's request, consistent with various embodiments. Addition service 214 allows specific, previously-subtracted control elements to be incrementally added to dynamic groups. In this way, dynamic groups can eventually be restored to equilibrium. Addition service 214 is initiated by a request to add a specific control element to a dynamic group. The requested control element is added to the dynamic group, the modified dynamic group is stored, and presenting service 220 presents the modified, dynamic group to users.

In some embodiments, addition service 214 also allows users to request that more, unspecified control elements be added to the currently-presented, dynamic group, consistent with various embodiments. With this type of request, dynamic groups that are not presently at equilibrium are set to equilibrium with one user action. Dynamic groups that are presently at equilibrium result in navigation to the next higher, grouping hierarchy level, again, with one user action. The request for more control elements requires navigation to a larger, parent group. Addition's use of dynamic groups, equilibrium and grouping hierarch levels provides users flexible, efficient and easy control of control elements.

Addition service 214 is initiated by a request to add more, unspecified control elements to a dynamic group, consistent with various embodiments. Addition service 214 retrieves the dynamic group, the corresponding predefined group and the availability states of the corresponding accessories. Addition service 214 uses that information to determine whether the dynamic group is at equilibrium. If the dynamic group is not at equilibrium, addition service 214 requests equilibrium service 212 to reset equilibrium for the dynamic group, and presenting service 220 presents the dynamic group in its equilibrium state to users.

If the dynamic group is at equilibrium, addition service 214 determines whether or not that group is at the highest grouping hierarchy level. If the dynamic group is not at the highest level, presenting service 220 presents a new dynamic group which is at next highest level. If the dynamic group is at the highest level, presenting service 220 presents that dynamic group. In this instance, the request for more control elements cannot be satisfied because users are already being presented with the all control elements.

Accessory-Driven Service

Turning back to FIG. 2, accessory-driven service 215 subtracts control elements from (or adds control elements to) dynamic groups based on a change to an accessory's availability or characteristic, consistent with various embodiments. Subtraction and addition can be explicitly initiated by users. Subtraction and addition can also be implicitly initiated by the control system when changes to accessories occur. This non-trivial linkage between changes to accessories and dynamic groups can predict and encode user intent. Unlike current control systems, users can be intelligently presented with only the control elements needed at the moment. Accessory-driven service 215 leverages accessory characteristic states and accessory availability states to inform grouping and presentation. In that way, the control system stays one step ahead of the user, predicting what control elements will and will not be desired.

This is a key feature of control systems with dynamic groups. If users recently turned off an accessory, users most likely do not want to control it, at least in the near term. If an accessory is unavailable to the control system, users cannot control it and most likely do not need or want it presented to them. These turned off and unavailable accessories can and should be removed from presentation. In the present invention, users are only presented with the accessories they are interested in controlling at any given moment.

Accessory-driven service 215 is initiated by a change to an accessory's characteristic state or availability state, consistent with various embodiments. When a change occurs, accessory-driven service 215 determines whether or not a subtraction or an addition should be performed. In some embodiments, when an accessory's characteristic state changes from 'on' to 'off' or when an accessory's availability state changes from 'available' to 'unavailable', accessory-driven service 215 requests that subtraction service 213 subtract the associated control element from its dynamic group. Just as with user-initiated requests, a navigation within the hierarchy is triggered if, after the subtraction, there are no remaining control elements in the dynamic group. Similarly, when an accessory's characteristic state changes from 'off' to 'on' or when an accessory's availability state changes from 'unavailable' to 'available', accessory-driven service 215 requests that addition service 214 add the associated control element to its dynamic group.

Presenting Service

Turning back to FIG. 2, presenting service 220 presents dynamic groups to users, consistent with various embodiments. Dynamic groups are only useful to users if the added complexity is understood, and can be taken advantage of, by users. A control element's membership in a dynamic group must be effectively conveyed along with that element's characteristics. Current control systems are challenged to convey that additional information without creating more clutter, since these systems are already overloaded with 'visual noise'. In the present invention, control elements are only presented that are in members of the dynamic group at the currently-presented level of the grouping hierarchy. Presentation conveys membership.

Presentation is determined based on changes to either a dynamic group or the current level of the grouping hierarchy, consistent with various embodiments. If either change, these states are reflected by changing the presented control elements. As a result, whether a control element is presented or not, serves as both a visual and logical representation of the element's membership in the dynamic group. At any given moment, all presented control elements can be controlled separately or together, since they necessarily are members of the same dynamic group. Likewise, any control elements not presented are not members and cannot be controlled. This results in a simpler, more sparse presentation that is easier to understand and manipulate. Everything presented can be controlled together without additional selection or grouping actions.

Presentation service 220 is initiated by change to a dynamic group or to the current level of the grouping hierarchy, consistent with various embodiments. Subtraction service 213 and addition service 214 both make changes to dynamic groups which, in turn, initiates a request to presentation service 220. Subtraction service 213 and addition service 214 are also both responsible for navigation through the levels of the grouping hierarchy. Certain subtractions and additions initiate further requests to presentation service 220. Subtracting the last control element of a dynamic group results in users being presented with a different level of the grouping hierarchy. Adding more, unspecified control elements to a dynamic group that is at equilibrium results in users being presented with a different level of the grouping hierarchy.

In some embodiments, presentation of control elements appears and functions identically across all levels of the grouping hierarchy. Control elements for all grouping hierarchy levels (e.g. homes, rooms, accessories) are identical; each one looks the same and affords the user the ability to control the exact same characteristics in the same way. This is made possible because presentation is solely determined by the current level of the grouping hierarchy Level and the current dynamic group. Users benefit from quick and intuitive control at each level of the grouping hierarchy. This contrasts with many existing interfaces, which lack control elements at all but the accessory level of the grouping hierarchy. In those interfaces, users must navigate away from the groups they want to control (which lack control elements), down to control elements for each individual accessory.

In some embodiments, the presentation of control elements is fully nested. That means each parent group's child groups are presented as nested within their parent group at each level of the grouping hierarchy. This is enabled by presentation service's 220 use of dynamic groups and grouping hierarchy level. For example, child groups can be presented as smaller shapes (triangles, circles, rectangles, . . . ) within their parent group's matching, but larger, shape. Navigation from the highest level of the grouping hierarchy (e.g., a home) to the lowest level of the grouping hierarchy (e.g., a light in a room of the home) is fully nested. Users manipulate the presentation by 'zooming in' and 'zooming out' of dynamic groups. For example, in order to move from the home group to the room group, users zoom in by selecting that room group's triangle presented inside the home group's triangle. The room's individual lights are presented as smaller triangles inside the room group's triangle. Users can zoom in to a light by selecting its triangle or, consistent with various embodiments, can zoom return to the home group, selecting the background of the presentation. Fully-nested navigation avoids the jarring effect of switching modes that is required by many, existing control systems.

Exemplary Embodiments

Figure 3:
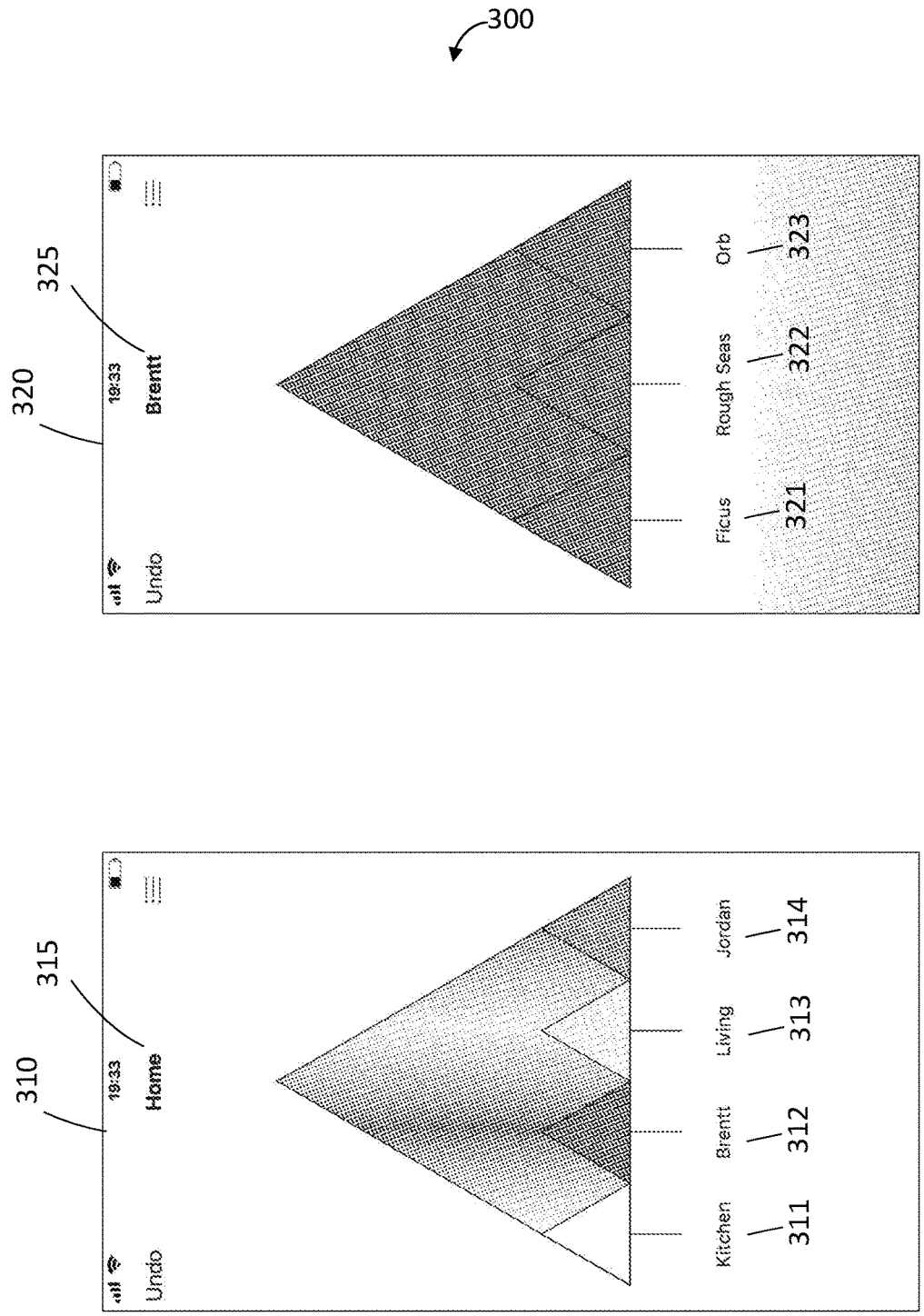
FIG. 3 is a series of exemplar screen shots from a user of FIG. 2, which illustrate control elements, predefined groups, dynamic groups, grouping hierarchy level and equilibrium, consistent with various embodiments.

Turning now to FIG. 3, FIG. 3 is a series of exemplar screen shots 300 from a device of a user of FIG. 2, which illustrate control elements, predefined groups, dynamic groups, grouping hierarchy level and equilibrium, consistent with various embodiments. Screen shots 310 and 320 may be similar to screen shots from a device of a user of FIG. 2. In screen shot 310, user is presented with control elements Home 315, Kitchen 311, Brentt 312, Living 313 and Jordan 314. Home 315 represents a dynamic group in an equilibrium state with its predefined group. Earlier, user created a predefined home group, which contained predefined room groups, which contained predefined light accessories. Dynamic group Home 315 contains and is the parent group of dynamic groups Kitchen 311, Brentt 312, Living 313 and Jordan 314. Home 315 is at the highest level of the group hierarchy level. Kitchen 311, Brentt 312, Living 313 and Jordan 314 are at the next highest level.

In this example, consistent with various environments, user selected Brentt 312 on screen shot 310. This selection resulted in a change in the grouping hierarchy level. User traversed down the grouping hierarchy level to the lighting accessories contained within dynamic group Brentt 312. Whenever there is a change to the presented, grouping hierarchy level or to the presented, dynamic group or groups, users are presented with the change. Screen shot 320 shows the changed grouping hierarchy level. User is now presented with dynamic group Brentt 325 and the control elements contained within it, Ficus 321, Rough Seas 322 and Orb 323. These control elements happen to be individual accessories, controllable lights. Dynamic group Brentt 325 contains and is the parent group of dynamic groups Ficus 321, Rough Seas 322 and Orb 323. Brentt 325 is at a higher level of the group hierarchy level. Ficus 321, Rough Seas 322 and Orb 323 are at the next lowest level.

Figure 4:
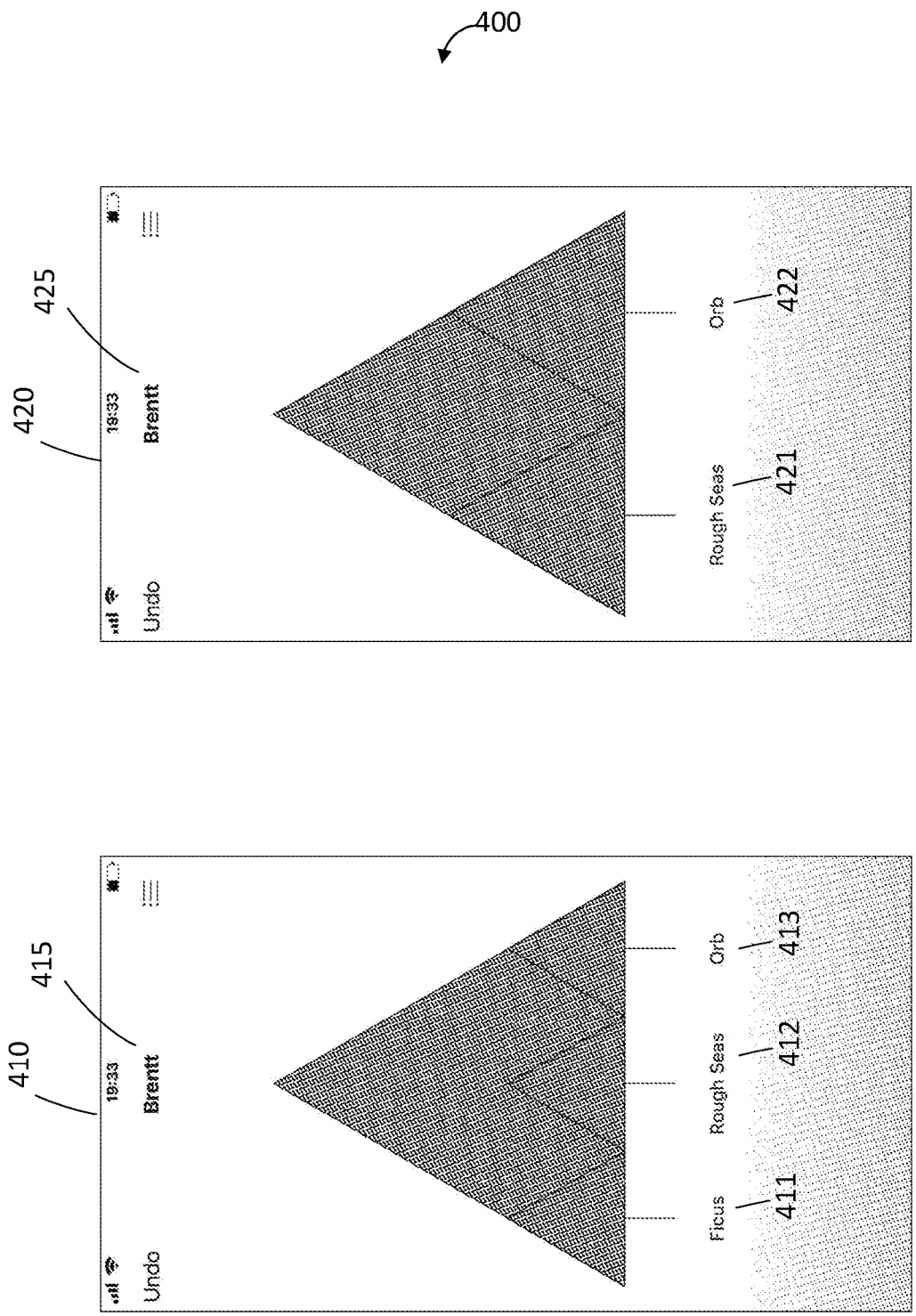
FIG. 4 is a series of exemplar screen shots from a user of FIG. 2, which illustrate the subtraction method, consistent with various embodiments.

Turning now to FIG. 4, FIG. 4 is a series of exemplar screen shots 400 from a device of a user of FIG. 2, which illustrate the subtraction method, consistent with various embodiments. Screen shots 410 and 420 may be similar to screen shots from a device of a user of FIG. 2. In screen shot 410, user is presented with dynamic group Brentt 415 and the control elements contained within it, light accessories, Ficus 411, Rough Seas 412 and Orb 413. In this example, user requested that control element Ficus 411 on screen shot 410 be subtracted from dynamic group Brentt 415. As a result of the change to a dynamic group, user is presented with screen shot 420, which presents a modified group, Brentt 425. Brentt 425 now only contains its two remaining control elements, Rough Seas 421 and Orb 422, consistent with various environments.

Figure 5:
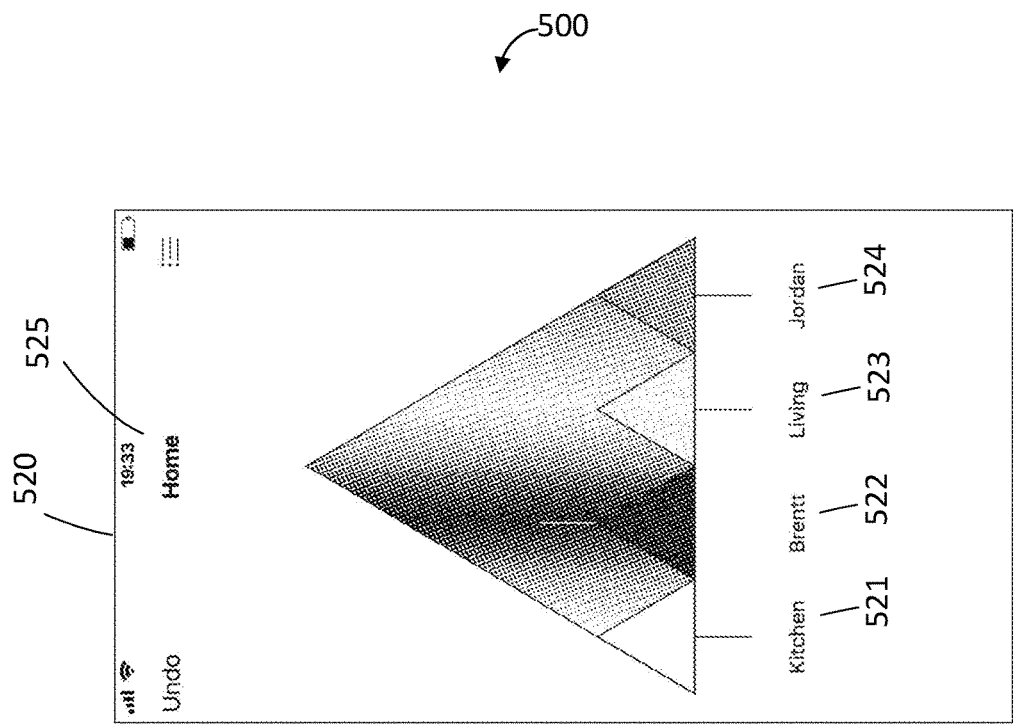
FIG. 5 is a series of exemplar screen shots from a user of FIG. 2, which illustrate the addition method, consistent with various embodiments.
Figure 5:
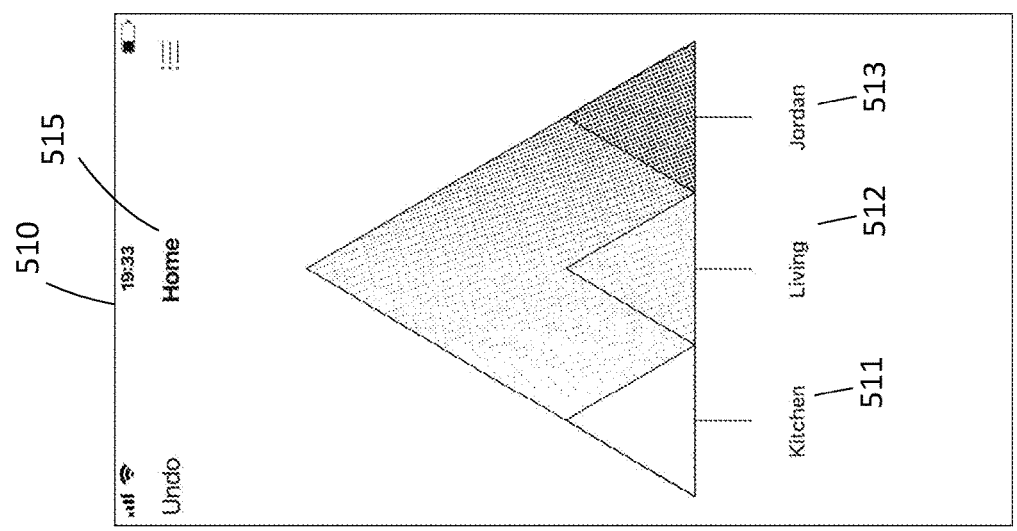

Turning now to FIG. 5, FIG. 5 is a series of exemplar screen shots 500 from a device of a user of FIG. 2, which illustrate the addition method, consistent with various embodiments. Screen shots 510 and 520 may be similar to screen shots from a device of a user of FIG. 2. In screen shot 510, user is presented with dynamic group Home 515 and the current control elements contained within it, dynamic groups Kitchen 511, Brentt 312, Living 512 and Jordan 513. In this example, user requested that more control elements be added to Home 515. As a result of the change to a dynamic group, user is presented with screen shot 520, which presents a dynamic group Home 525, where control element Brentt 522 has been added back to its parent group and where Home 525 has set to its equilibrium state. Home 525 is now in equilibrium with its predefined group, that is to say, it now contains all predefined and available control elements contained within that predefined group, consistent with various environments.

Figure 6:
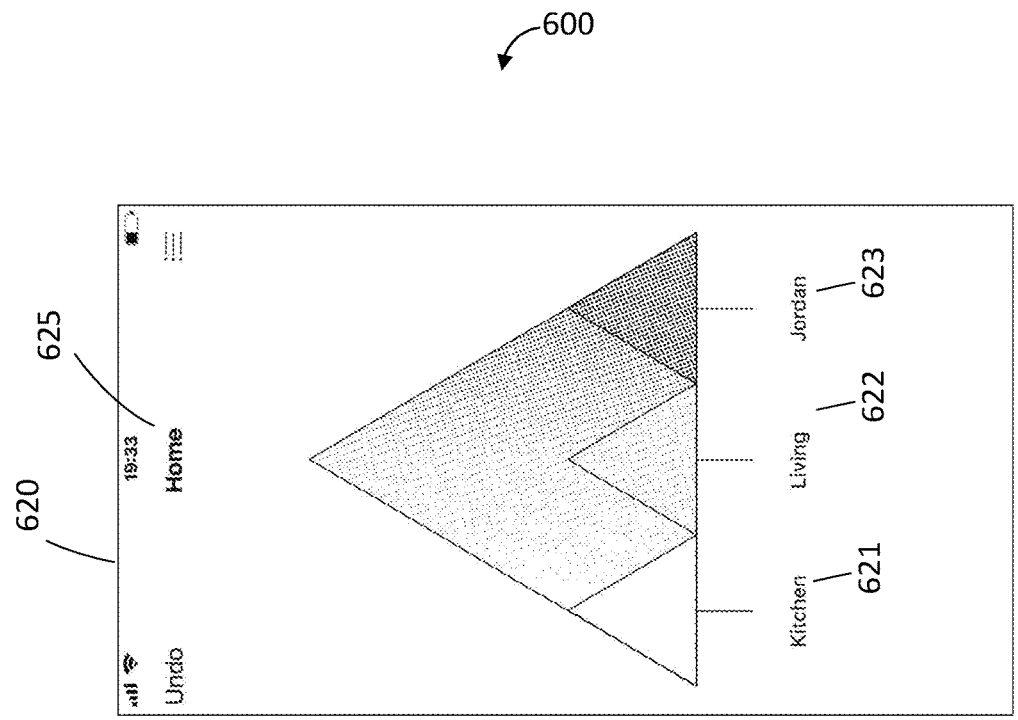
FIG. 6 is a series of exemplar screen shots from a user of FIG. 2, which illustrate the accessory-driven grouping method, consistent with various embodiments.
Figure 6:
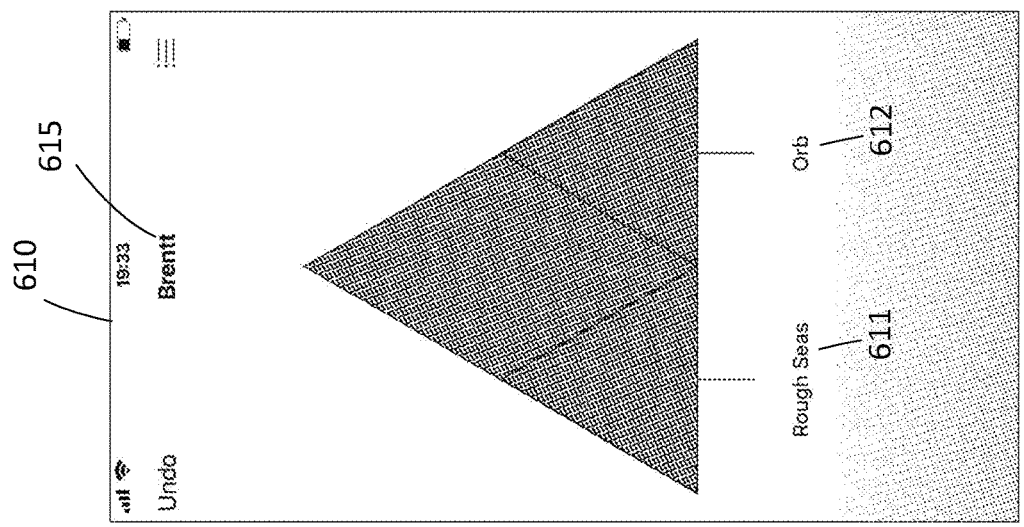

Turning now to FIG. 6, FIG. 6 is a series of exemplar screen shots 600 from a device of a user of FIG. 2, which illustrate the accessory-driven grouping method, consistent with various embodiments. Screen shots 610 and 620 may be similar to screen shots from a device of a user of FIG. 2. In screen shot 610, user is presented with dynamic group Brentt 615 and the control elements contained within it, light accessories Rough Seas 611 and Orb 612. In this example, user requested that the state of the accessory characteristic of 'power' be changed from 'ON' to 'OFF' for all accessories contained within dynamic group Brentt 615. As a result of the change to this particular accessory characteristic, user is presented with screen shot 620, which shows the grouping hierarchy level above Brentt 615, which is its parent group, Home 625. Because all lights in Brentt 610 where turned off, the control system traversed up the hierarchy grouping level and subtracted control element Brentt 615 from dynamic group Home 625, consistent with various environments.

Figure 7:
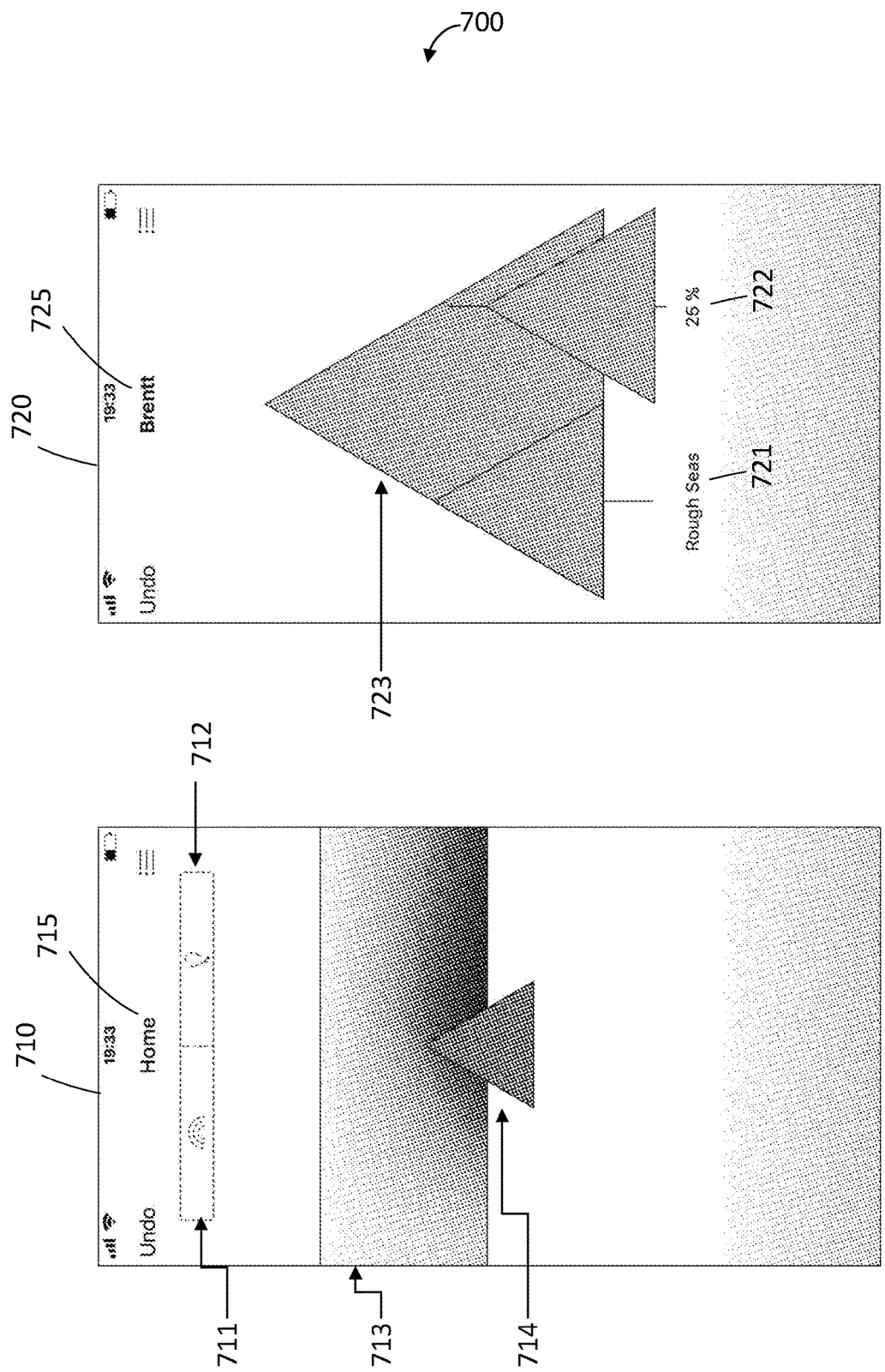
FIG. 7 is a series of exemplar screen shots from a user of FIG. 2, which illustrate parity of control, consistent with various embodiments.

Turning now to FIG. 7, FIG. 7 is a series of exemplar screen shots 700 from a device of a user of FIG. 2, which illustrate the parity of control, consistent with various embodiments. Screen shots 710 and 720 may be similar to screen shots from a device of a user of FIG. 2. In screen shot 710, user is presented with controls related to the light accessory characteristic, color 711. The user selected color 714 from the available characteristics 713 for all the accessories in dynamic group Home 715. In screen shot 720, user is presented with controls related to the light accessory characteristic, brightness. The user selected brightness 722 from the available characteristics 723 for all the accessories in dynamic group Brentt 725.

Example System for Control Systems with Dynamic Groups

Figure 8:
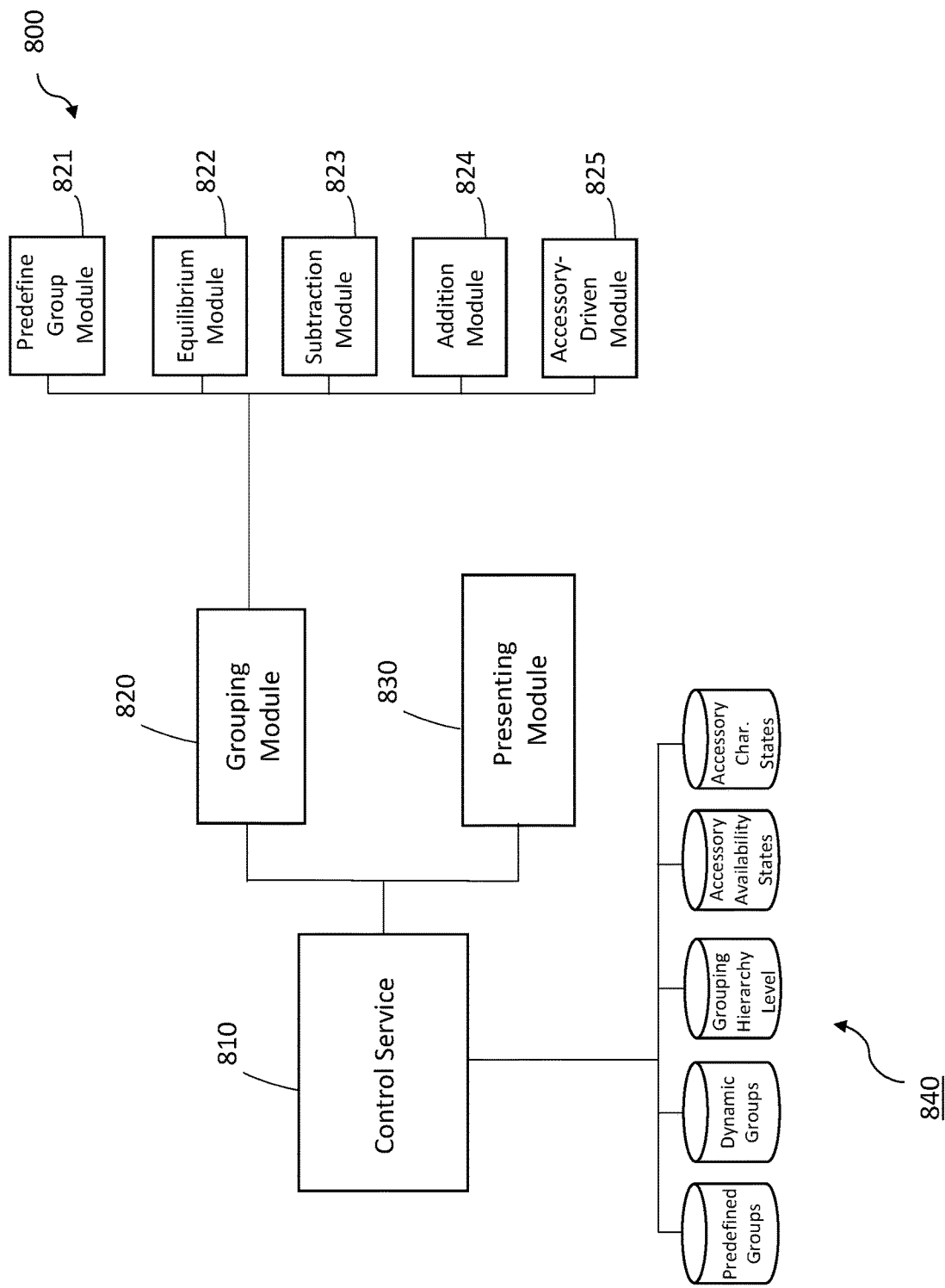
FIG. 8 is a block diagram of a system for a control service of FIG. 1, consistent with various embodiments.

Turning now to FIG. 8, FIG. 8 is a block diagram of a system for a control service of FIG. 1, consistent with various embodiments.

In various embodiments, system 800 is implemented to perform functions such as the functions of environment 100. In various embodiments, control service 810 may be similar to the control service 120 of FIG. 1. Control service 810 includes various modules that provide services including grouping services and presenting services.

Control service 810 includes grouping module 820 and presenting module 830. In various embodiments, grouping module 820 may be similar to grouping service 121. Grouping module 820 includes modules to perform grouping services. These modules may be similar to the grouping services of FIG. 2. Predefined group module 821 may be similar to predefined group service 211 of FIG. 2. Predefined group module 821 facilitates the user to create and modify predefined groups. Equilibrium module 822 may be similar to equilibrium service 212 of FIG. 2. Equilibrium module 822 facilitates the creation of dynamic groups and the setting of their equilibrium states. Subtraction module 823 may be similar to subtraction service 213 of FIG. 2. Subtraction module 823 facilitates the subtraction of control elements from dynamic groups. Addition module 824 may be similar to addition service 214 of FIG. 2. Addition module 824 facilitates the adding of control elements to dynamic groups. Accessory-driven module 825 may be similar to accessory-driven service 215 of FIG. 2. Accessory-driven module 825 facilitates subtracting control elements from (and adding to control elements to) dynamic groups based on changes to an accessory's characteristic state or availability state.

In various embodiments, presenting module 830 may be similar to presenting service 122. Presenting module facilitates the presentation of control elements to users.

Flow Diagrams

Figure 9:
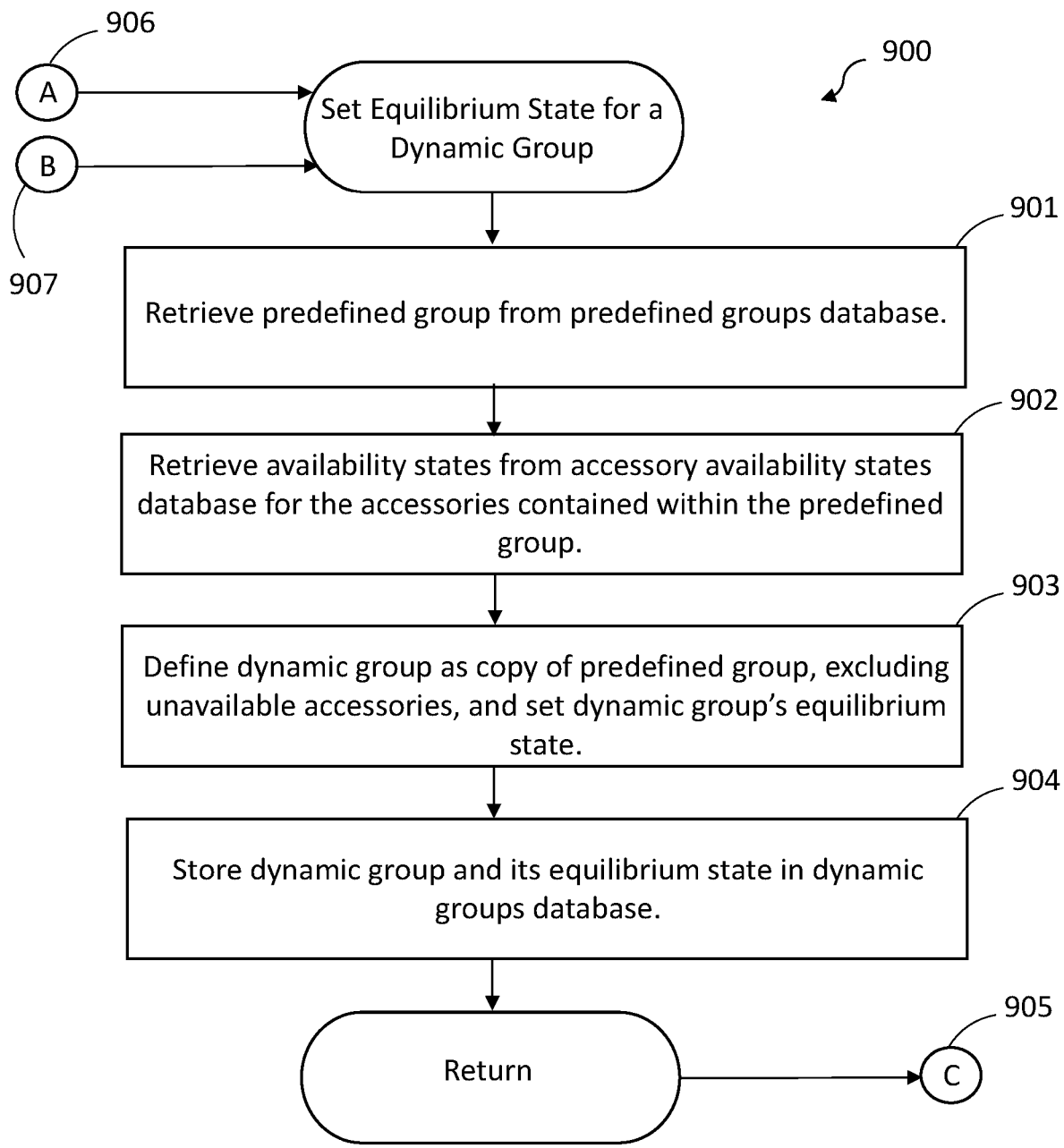
FIG. 9 is a flow diagram of a process of setting or restoring equilibrium, consistent with various embodiments.

Turning now to FIG. 9, FIG. 9 is a flow diagram of a process of setting or restoring equilibrium, consistent with various embodiments.

In some embodiments, process 900 may be executed in a system such as system 800 of FIG. 8. Process 900 is initiated to set a dynamic group's equilibrium state when a predefined group is created or modified. At block 901, equilibrium module 822 retrieves a predefined group from a predefined groups database. In some embodiments, the predefined group database may be similar to predefined groups database 141 of FIG. 1. At block 902, equilibrium module 822 retrieves the availability states from an accessory availability states database for the accessories contained within the predefined group. In some embodiments, the accessory availability states database may be similar to accessory availability states database 144 of FIG. 1. At block 903, equilibrium module 822 defines a dynamic group as a copy of the predefined group, excluding the unavailable accessories, and sets the copy as the dynamic group's equilibrium state. At block 904, equilibrium module 822 stores the dynamic group and its equilibrium state in a dynamic groups database. In some embodiments, the dynamic groups database may be similar to dynamic groups database 142 of FIG. 1.

Process 900 may also be initiated to set a dynamic group's equilibrium state under certain conditions where control elements are subtracted from, or added to, the dynamic group. If this scenario occurs, the further steps occur as illustrated in FIGS. 10 and 11, as indicated by the circled letter "C" in FIG. 9 at 905, FIG. 10 at 1006 and FIG. 11 at 1105.

Figure 10:
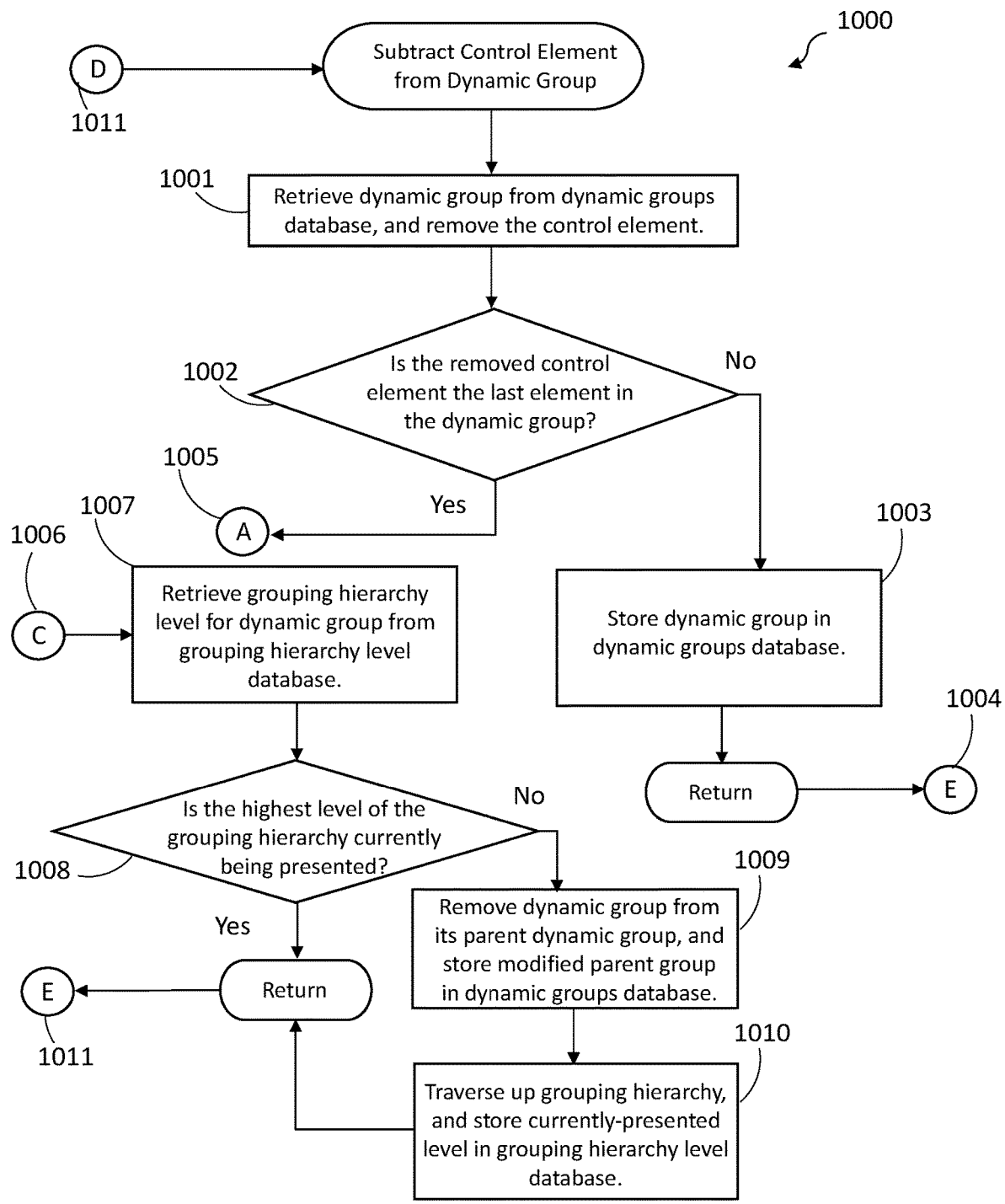
FIG. 10 is a flow diagram of a process of subtracting a control element from a dynamic group, consistent with various embodiments.
Figure 11:
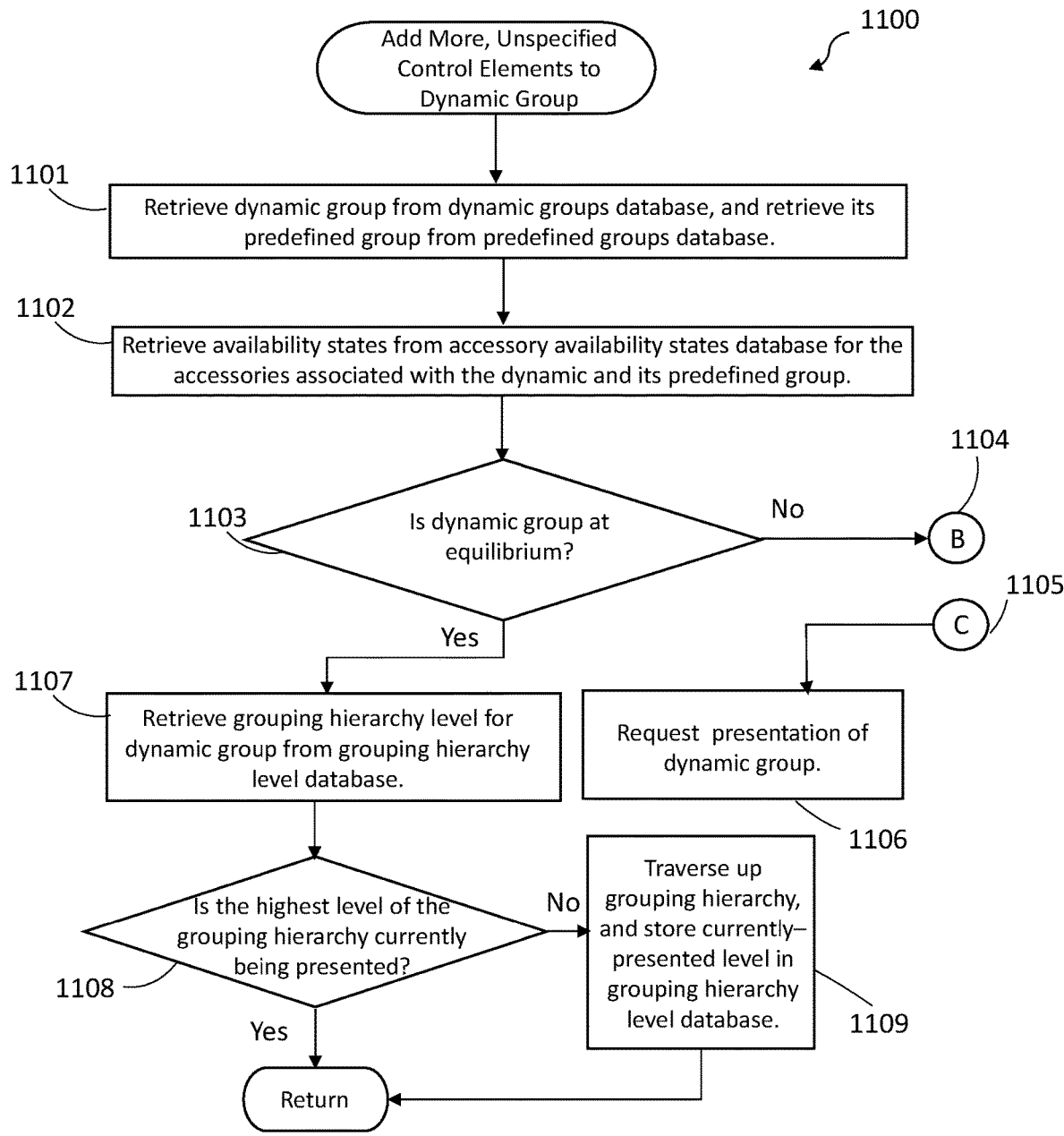
FIG. 11 is a flow diagram of a process of adding a control element to a dynamic group, consistent with various embodiments.

Turning now to FIG. 10, FIG. 10 is a flow diagram of a process of subtracting a control element from a dynamic group, consistent with various embodiments.

In some embodiments, process 1000 may be executed in a system such as system 800 of FIG. 8. Process 1000 is initiated by a user request. At block 1001, subtraction module 823 retrieves the dynamic group from a dynamic groups database and removes the control element. In some embodiments, the dynamic groups database may be similar to dynamic groups database 142 of FIG. 1. At block 1002, subtraction module 823 determines whether the removed control element is the last element in the dynamic group. If not, at block 1003, subtraction module 823 stores the modified dynamic group in the dynamic groups database.

If the removed control element is the last element in the dynamic group, further steps occur as illustrated in FIG. 9, as indicated by the circled letter "A" in FIG. 10 at 1005 and in FIG. 9 at 906. Subsequent steps occur as illustrated in FIG. 10, as indicated by the circled letter "C" in FIG. 9 at 905 and FIG. 10 at 1006.

At block 1007, subtraction module 823 retrieves the grouping hierarchy level for the dynamic group from a grouping hierarchy level database. In some embodiments, the grouping hierarchy level database may be similar to grouping hierarchy level database 143 of FIG. 1. At block 1008, subtraction module 823 determines whether the highest level of the grouping hierarchy is currently being presented. Put another way, is the currently-presented dynamic group at the highest level of the grouping hierarchy. If so, the process returns to the initiating service. If not, at block 1009, subtraction module 823 removes the dynamic group from its parent dynamic group, and stores the modified parent group in the dynamic groups database. At block 1010, subtraction module 823 traverses up the grouping hierarchy, and stores the currently-presented level in the grouping hierarchy level database.

Figure 12:
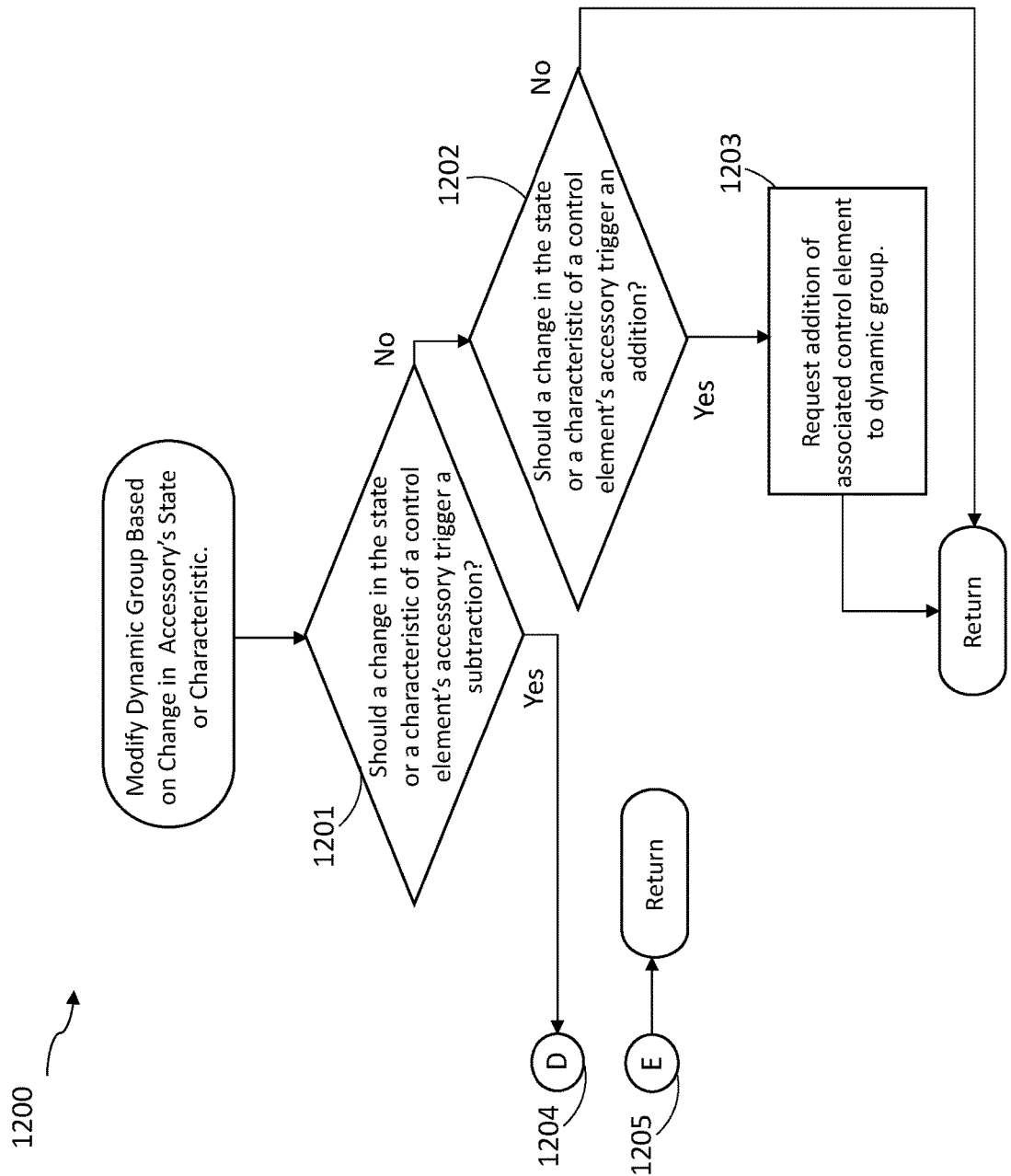
FIG. 12 is a flow diagram of a process of modifying a dynamic group based on a change in an accessory's state or characteristic, consistent with various embodiments.

Process 1000 may also be initiated to subtract control elements under certain conditions where there is a change in an accessory's state or characteristic. If this scenario occurs, the further steps occur as illustrated in FIG. 12, as indicated by the circled letter "E" in FIG. 10 at 1004 and 1011, and in FIG. 12 at 1205.

Turning now to FIG. 11, FIG. 11 is a flow diagram of a process of adding more, unspecified control elements to a dynamic group, consistent with various embodiments.

In some embodiments, process 1100 may be executed in a system such as system 800 of FIG. 8. Process 1100 is initiated by a user request. At block 1101, addition module 824 retrieves the dynamic group from a dynamic groups database. In some embodiments, the dynamic groups database may be similar to dynamic groups database 142 of FIG. 1. At block 1101, addition module 824 also retrieves the dynamic group's predefined group from a predefined groups database. In some embodiments, the predefined group database may be similar to predefined groups database 141 of FIG. 1. At block 1102, addition module 824 retrieves the availability states from an accessory availability states database for the accessories associated with dynamic group and its corresponding predefined group. In some embodiments, the accessory availability states database may be similar to accessory availability states database 144 of FIG. 1. At block 1102, addition module 824 uses the retrieved information to determine whether the dynamic group is at equilibrium. Unavailable accessories are excluded from a dynamic group's equilibrium state.

If the dynamic group is not at equilibrium, further steps occur as illustrated in FIG. 9, as indicated by the circled letter "B" in FIG. 11 at 1104 and in FIG. 9 at 907. Subsequent steps occur as illustrated in FIG. 11, as indicated by the circled letter "C" in FIG. 9 at 905 and FIG. 11 at 1105. At block 1106, addition module 824 requests that the dynamic group, which has been set to its equilibrium state, be presented.

If the dynamic group is at equilibrium, at block 1107, addition module 824 retrieves the grouping hierarchy level for the dynamic group from a grouping hierarchy level database. In some embodiments, the grouping hierarchy level database may be similar to grouping hierarchy level database 143 of FIG. 1. At block 1108, addition module 824 determines whether the highest level of the grouping hierarchy is currently being presented. Put another way, is the currently-presented dynamic group at the highest level of the grouping hierarchy. If so, the process returns to the initiating service. If not, at block 1109, addition module 824 traverses up the grouping hierarchy, and stores the currently-presented level in the grouping hierarchy level database.

Turning now to FIG. 12, FIG. 12 is a flow diagram of a process of modifying a dynamic group based on a change in an accessory's availability state or characteristic state, consistent with various embodiments.

In some embodiments, process 1200 may be executed in a system such as system 800 of FIG. 8. Process 1200 is initiated when a change occurs to an accessory's availability state or characteristic state. At block 1201, accessory-driven module 825 determines whether a change in the availability state or characteristic state of an accessory should trigger a subtraction of that accessory's associated control element. If so, further steps occur as illustrated in FIG. 10, as indicated by the circled letter "D" in FIG. 12 at 1204 and in FIG. 10 at 1011. Subsequent steps occur as illustrated in FIG. 12, as indicated by the circled letter "E" in FIG. 10 at 1004 and 1011, and FIG. 12 at 1205. At 1205, the process returns to the initiating service.

If a subtraction is not triggered, accessory-driven module 825 determines whether a change in the availability state or characteristic state of an accessory should trigger an addition of that accessory's associated control element. If so, accessory-driven module 825 requests addition of the associated control element to its dynamic group. If not, the process returns to the initiating service.

Figure 13:
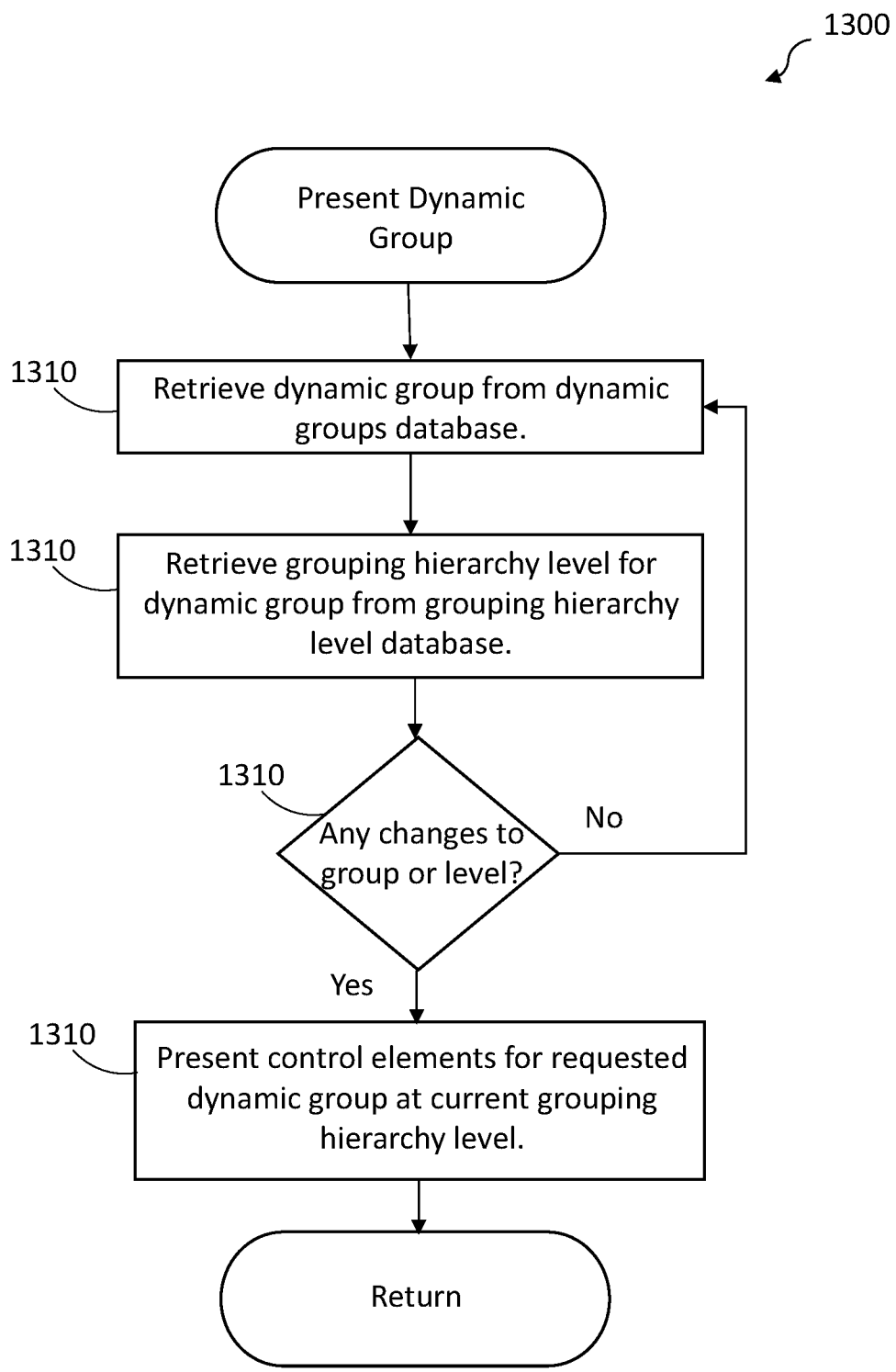
FIG. 13 is a flow diagram of a process of presenting a dynamic group, consistent with various embodiments.

Turning now to FIG. 13, FIG. 13 is a flow diagram of a process of presenting a dynamic group, consistent with various embodiments.

In some embodiments, process 1300 may be executed in a system such as system 800 of FIG. 8. Process 1300 is initiated when a change occurs to a dynamic group, such as a subtraction or addition, or to the currently-presented level of the grouping hierarchy.

At block 1301, presenting module 830 retrieves the dynamic group from a dynamic groups database. In some embodiments, the dynamic groups database may be similar to dynamic groups database 142 of FIG. 1. At block 1302, presenting module 830 retrieves the grouping hierarchy level for the dynamic group from a grouping hierarchy level database. In some embodiments, the grouping hierarchy level database may be similar to grouping hierarchy level database 143 of FIG. 1. At block 1303, presenting module 830 determines whether there have been any changes to the dynamic group or the grouping hierarchy level. If so, at block 1304, presenting module 830 presents the changed dynamic group and/or the changed grouping hierarchy level. If not, the process returns to block 1311.

Example Scenarios where Dynamic Groups can be Used
Lighting

Dynamic grouping and presentation can be used to control lighting, and is in fact the embodiment most thoroughly discussed up to this point. An application could be a home with multiple rooms. Control elements for a home might contain four different rooms, each containing several lightbulbs whose hue, brightness, saturation, and ON/OFF state can be controlled.

Water Features

Dynamic grouping and presentation can also be used to control water features. For example, an application could be a large fountain with multiple groupings of spray nozzles. Control elements for "Grand Fountain", which contains four different pools, each containing several spray nozzles. Users could control groups and subgroups of pools and spray nozzles. Users could adjust characteristics like water stream intensity, droplet spacing, droplet size and spray spread, or turn nozzles on and off.

Audio

Dynamic grouping and presentation can be used to control audio sources. For example, an application could be an auditorium with many speakers, both at the stage and on the balcony. Control elements for the Auditorium could contain two different main speaker groupings, each containing four speakers. Users could control groups and subgroups of auditorium sections and speakers. Users could adjust characteristics like speaker volume, or turn speakers on and off.

Example Computing System

Figure 14:
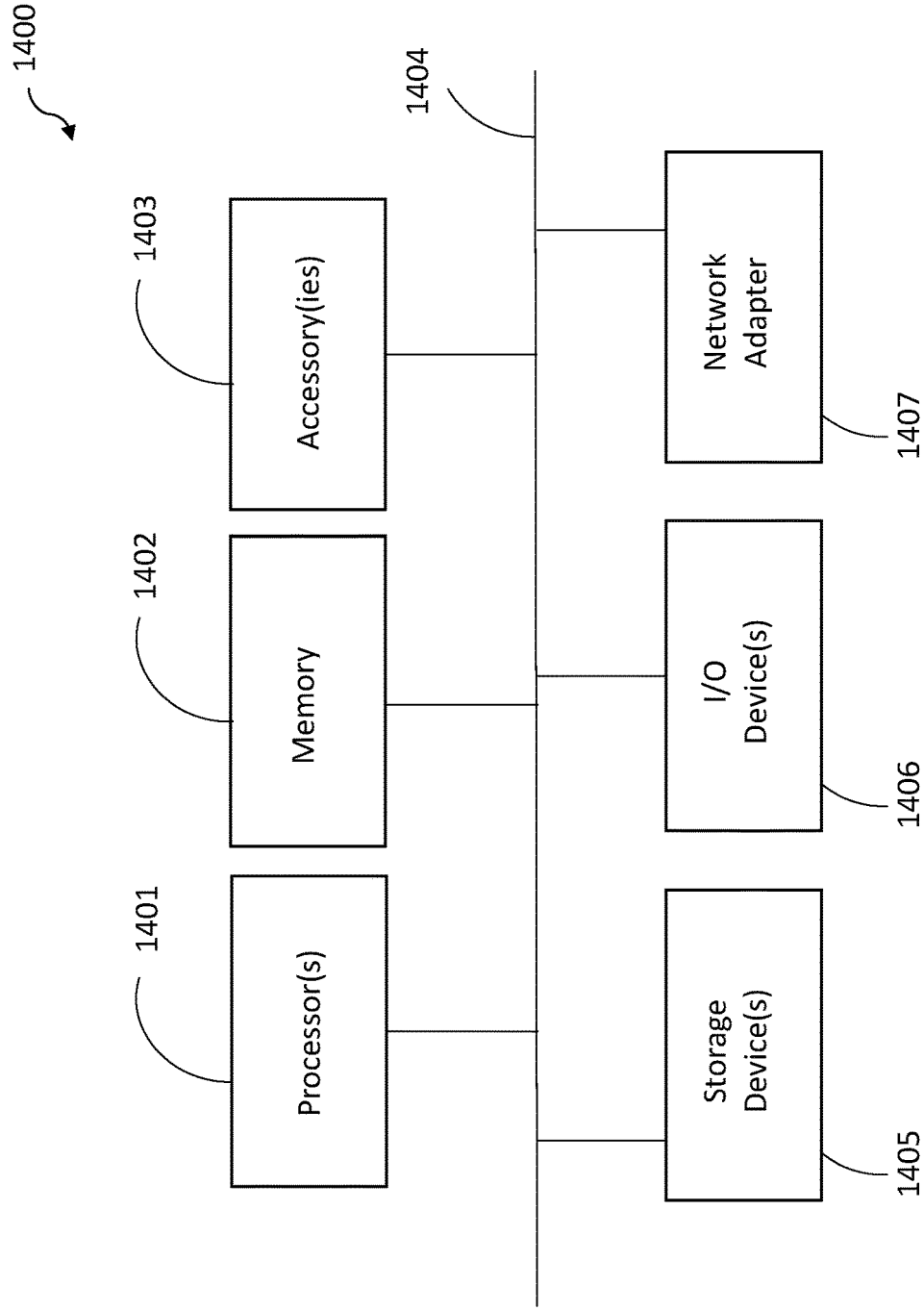
FIG. 14 is a block diagram illustrating components of a computer system that may perform various operations described by the technology.

Turning now to FIG. 14, FIG. 14 is a block diagram illustrating components of an apparatus that may perform various operations described by the technology.

FIG. 14 is a block diagram of a computer system as may be used to implement features of some embodiments of the disclosed technology. Computing system 1400 may include one or more central processing units ("processors") 1401, memory 1402, one or more accessories 1403 (e.g., IoT devices), input/output devices 1406 (e.g., keyboard and pointing devices, and display devices), storage devices 1405 (e.g., disk drives), and one or more network adapters 14007 (e.g., network interfaces) that are connected to an interconnect 1404. The interconnect 1404 is illustrated as an abstraction that represents any one or more separate physical buses, point to point connections, or both connected by appropriate bridges, adapters, or controllers. The interconnect 1404, therefore, may include, for example, a system bus, a Peripheral Component Interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1402 and storage devices 1405 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media may include computer-readable media (e.g., "non-transitory" media) and computer-readable transmission media. The instructions stored in memory 1402 may be implemented as software and/or firmware to program the processor(s) 1401 to carry out actions described above. In some embodiments, such software or firmware may be initially provided to the computing system 1400 by downloading it from a remote system through the computing system 1400 (e.g., via network adapter 1407).

The technology introduced herein may be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure in this specification are used to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing may be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, sub-steps may be performed in parallel, illustrated logic may be omitted, other logic may be included, etc.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Furthermore, in the specification, figures and claims, reference is made to particular features (including method steps) of the invention. It is to be understood that the disclosure of the invention includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C may consist of (i.e., contain only) components A, B and C, or may contain not only components A, B, and C but also contain one or more other components.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," "program," "device," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. § 112 ¶6. Specifically, the use of "step of" in the claims herein is not intended to invoke the provisions of U.S.C. § 112 ¶6.

I claim:

1. A method comprising:
 receiving, by a control service executing on a computer system, a plurality of requests with respect to at least one of one or more accessories,
  the plurality of requests having at least a first request and a second request,
  the accessories having one of one or more characteristics with one or more characteristic states,
   the characteristic states being stored in an accessory characteristic states database,
  the accessories each having an availability state corresponding to each accessory's availability to the control service,
   the availability state being stored in an accessory availability states database,
  the accessories being associated with one or more of one or more control elements,
   the control elements being either one accessory or a grouping of accessories,
    the grouping being either a predefined group or a dynamic group,
     the predefined group being stored in a predefined groups database,
     the dynamic group being associated with a predefined group,
     the dynamic group having an equilibrium state,
     the dynamic group and the equilibrium state being stored in a dynamic groups database,
   the control elements being organized in grouping hierarchy levels,
    the grouping hierarchy levels being stored in a grouping hierarchy level database,
  the first request being one of set equilibrium, subtract control element, add control element, modify dynamic group or present dynamic group; and
  the second request being a request to change accessory characteristic state for a requested accessory characteristic state;
 executing, by the equilibrium service upon determining the first request is a request to set equilibrium for a requested dynamic group, the first request by:
  retrieving an associated predefined group from the predefined groups database;
  retrieving availability states from the accessory availability states database for the one or more accessories contained within the predefined database;
  defining the requested dynamic group as a copy of the associated predefined group, excluding unavailable accessories, if any;
  setting the copy as a new equilibrium state for the requested dynamic group; and
  storing the requested dynamic group and the new equilibrium state in the dynamic groups database; and
 executing, by the control service upon determining the first request is a request by one of one or more services of grouping service, the first request by one of one or more services of grouping service,
  the grouping service consisting of one of one or more services of subtraction service, addition service, accessory-driven service, or presenting service; and
 executing, by the control service, the second request by changing the requested accessory characteristic state.

2. A system comprising:
 a processor;
 a request receipt logic that is configured to receive a plurality of requests with respect to at least one of one or more accessories,
  the plurality of requests having at least a first request and a second request,
  the accessories having one of one or more characteristics with one or more characteristic states,
   the characteristic states being stored in an accessory characteristic states database,
  the accessories each having an availability state corresponding to each accessory's availability to the control service,
   the availability state being stored in an accessory availability states database,
  the accessories being associated with one or more of one or more control elements,
   the control elements being either one accessory or a grouping of accessories,
    the grouping being either a predefined group or a dynamic group,
     the predefined group being stored in a predefined groups database,
     the dynamic group being associated with a predefined group,
     the dynamic group having an equilibrium state,
     the dynamic group and the equilibrium state being stored in a dynamic groups database,
   the control elements being organized in grouping hierarchy levels,
    the grouping hierarchy levels being stored in a grouping hierarchy level database, and
  the first request being one of set equilibrium, subtract control element, add control element, modify dynamic group or present dynamic group; and
  the second request being a request to change accessory characteristic state for a requested accessory characteristic state;
 a set equilibrium execute logic that is configured to execute, upon determining the first request is a request to set equilibrium, the first request by:
  retrieving an associated predefined group from the predefined groups database;
  retrieving availability states from the accessory availability states database for the one or more accessories contained within the predefined database;
  defining the requested dynamic group as a copy of the associated predefined group, excluding unavailable accessories, if any;

setting the copy as a new equilibrium state for the requested dynamic group; and storing the requested dynamic group and the new equilibrium state in the dynamic groups database;

a grouping execute logic that is configured to execute, upon determining the first request is a request by one of one or more services of grouping service, the first request by one of one or more services of grouping service, the grouping service consisting of one of one or more services of subtraction service, addition service, accessory-driven service or presenting service; and a control execute logic that is configured to execute the second request by changing the requested accessory characteristic state.

3. A method comprising:

receiving, by a control service executing on a computer system, a plurality of requests with respect to at least one of one or more accessories, the plurality of requests having at least a first request and a second request, the accessories having one of one or more characteristics with one or more characteristic states, the characteristic states being stored in an accessory characteristic states database, the accessories each having an availability state corresponding to each accessory's availability to the control service, the availability state being stored in an accessory availability states database, the accessories being associated with one or more of one or more control elements, the control elements being either one accessory or a grouping of accessories, the grouping being either a predefined group or a dynamic group, the predefined group being stored in a predefined groups database, the dynamic group being associated with a predefined group, the dynamic group having an equilibrium state, the dynamic group and the equilibrium state being stored in a dynamic groups database, the control elements being organized in grouping hierarchy levels, the grouping hierarchy levels being stored in a grouping hierarchy level database, the first request being one of set equilibrium, subtract control element, add control element, modify dynamic group or present dynamic group, and the second request being a request to change accessory characteristic state for a requested accessory characteristic state;

executing, by the control service, upon determining the first request is a request to subtract control element for a requested control element, the first request by:

retrieving an associated dynamic group from the dynamic groups database;

retrieving an associated grouping hierarchy level from the grouping hierarchy level database;

setting a new equilibrium state for the associated dynamic group upon determining the requested control element is the last control element in the associated dynamic group;

subtracting the associated dynamic group from any larger dynamic group that contains the associated dynamic group, storing the larger dynamic group, if any, in the dynamic groups database, traversing up to a next higher grouping hierarchy level above the associated grouping hierarchy level and storing the next higher grouping hierarchy level in the grouping hierarchy level database upon determining (a) the requested control element is the last control element in the associated dynamic group, and (b) the associated grouping hierarchy level is not at a highest grouping hierarchy level in the grouping hierarchy level database; and subtracting the requested control element from the associated dynamic group and storing the associated dynamic group in the dynamic groups database upon determining the requested control element is not the last control element in the associated dynamic group;

executing, by the control service upon determining the first request is a request by one of one or more services of grouping service, the first request by one of one or more services of grouping service, the grouping service consisting of one of one or more services of subtraction service, addition service, accessory-driven service or presenting service; and executing, by the control service, the second request by changing the requested accessory characteristic state.

4. A system comprising:

a processor;

a request receipt logic that is configured to receive a plurality of requests with respect to at least one of one or more accessories, the plurality of requests having at least a first request and a second request, the accessories having one of one or more characteristics with one or more characteristic states, the characteristic states being stored in an accessory characteristic states database, the accessories each having an availability state corresponding to each accessory's availability to the control service, the availability state being stored in an accessory availability states database, the accessories being associated with one or more of one or more control elements, the control elements being either one accessory or a grouping of accessories, the grouping being either a predefined group or a dynamic group, the predefined group being stored in a predefined groups database, the dynamic group being associated with a predefined group, the dynamic group having an equilibrium state, the dynamic group and the equilibrium state being stored in a dynamic groups database, the control elements being organized in grouping hierarchy levels, the grouping hierarchy levels being stored in a grouping hierarchy level database, the first request being one of set equilibrium, subtract control element, add control element, modify dynamic group or present dynamic group, and the second request being a request to change accessory characteristic state for a requested accessory characteristic state;

a subtraction execute logic that is configured to execute, upon determining the first request is a request to subtract control element for a requested control element, the first request by:

retrieving an associated dynamic group from the dynamic groups database;
retrieving an associated grouping hierarchy level from the grouping hierarchy level database;
setting a new equilibrium state for the associated dynamic group upon determining the requested control element is the last control element in the associated dynamic group;
subtracting the associated dynamic group from any larger dynamic group that contains the associated dynamic group, storing the larger dynamic group, if any, in the dynamic groups database, traversing up to a next higher grouping hierarchy level above the associated grouping hierarchy level and storing the next higher grouping hierarchy level in the grouping hierarchy level database upon determining
  (a) the requested control element is the last control element in the associated dynamic group, and
  (b) the associated grouping hierarchy level is not at a highest grouping hierarchy level in the grouping hierarchy level database; and
subtracting the requested control element from the associated dynamic group and storing the associated dynamic group in the dynamic groups database upon determining the requested control element is not the last control element in the associated dynamic group;
a grouping execute logic that is configured to execute, upon determining the first request is a request by one of one or more services of grouping service, the first request by one of one or more services of grouping service,
the grouping service consisting of one of one or more services of subtraction service, addition service, accessory-driven service or presenting service; and
a control execute logic that is configured to execute the second request by changing the requested accessory characteristic state.

5. A method comprising:
receiving, by a control service executing on a computer system, a plurality of requests with respect to at least one of one or more accessories,
  the plurality of requests having at least a first request and a second request,
  the accessories having one of one or more characteristics with one or more characteristic states,
    the characteristic states being stored in an accessory characteristic states database,
  the accessories each having an availability state corresponding to each accessory's availability to the control service,
    the availability state being stored in an accessory availability states database,
  the accessories being associated with one or more of one or more control elements,
    the control elements being either one accessory or a grouping of accessories,
      the grouping being either a predefined group or a dynamic group,
        the predefined group being stored in a predefined groups database,
        the dynamic group being associated with a predefined group,
        the dynamic group having an equilibrium state, the dynamic group and the equilibrium state being stored in a dynamic groups database,
    the control elements being organized in grouping hierarchy levels,
      the grouping hierarchy levels being stored in a grouping hierarchy level database,
  the first request being one of set equilibrium, subtract control element, add control element, modify dynamic group or present dynamic group, and
  the second request being a request to change accessory characteristic state for a requested accessory characteristic state;
executing, by the control service, upon determining the first request is a request to add control element for a requested control element, the first request by;
  retrieving an associated dynamic group from the dynamic groups database;
  retrieving an associated predefined group from the predefined groups database;
  retrieving one or more associated availability states for each of the one or more associated accessories from the accessory availability states database;
  retrieving an associated grouping hierarchy level from the grouping hierarchy level database;
  traversing up to a next higher grouping hierarchy level above the associated grouping hierarchy level and storing the next higher grouping hierarchy level in the grouping hierarchy level database upon determining
    (a) the associated dynamic group is at equilibrium, and
    (b) the associated grouping hierarchy level is not at a highest grouping hierarchy level in the grouping hierarchy level database; and
  setting a new equilibrium state for the associated dynamic group upon determining the associated dynamic group is not at equilibrium;
executing, by the control service upon determining the first request is a request by one of one or more services of grouping service, the first request by one of one or more services of grouping service,
  the grouping service consisting of one of one or more services of subtraction service, addition service, accessory-driven service or presenting service; and
executing, by the control service, the second request by changing the requested accessory characteristic state.

6. A system comprising:
a processor;
a request receipt logic that is configured to receive a plurality of requests with respect to at least one of one or more accessories,
  the plurality of requests having at least a first request and a second request,
  the accessories having one of one or more characteristics with one or more characteristic states,
    the characteristic states being stored in an accessory characteristic states database,
  the accessories each having an availability state corresponding to each accessory's availability to the control service,
    the availability state being stored in an accessory availability states database,
  the accessories being associated with one or more of one or more control elements,
    the control elements being either one accessory or a grouping of accessories,
      the grouping being either a predefined group or a dynamic group,
        the predefined group being stored in a predefined groups database, the dynamic group being associated with a predefined group,
the dynamic group having an equilibrium state,
the dynamic group and the equilibrium state being stored in a dynamic groups database,
the control elements being organized in grouping hierarchy levels,
the grouping hierarchy levels being stored in a grouping hierarchy level database,
the first request being one of set equilibrium, subtract control element, add control element, modify dynamic group or present dynamic group, and
the second request being a request to change accessory characteristic state for a requested accessory characteristic state;
an addition execute logic that is configured to execute, upon determining the first request is a request to add control element for a requested control element, the first request by:
retrieving an associated dynamic group from the dynamic groups database;
retrieving an associated predefined group from the predefined groups database;
retrieving one or more associated availability states for each of the one or more associated accessories from the accessory availability states database;
retrieving an associated grouping hierarchy level from the grouping hierarchy level database;
traversing up to a next higher grouping hierarchy level above the associated grouping hierarchy level and storing the next higher grouping hierarchy level in the grouping hierarchy level database upon determining
(a) the associated dynamic group is at equilibrium, and
(b) the associated grouping hierarchy level is not at a highest grouping hierarchy level in the grouping hierarchy level database; and
setting a new equilibrium state for the associated dynamic group upon determining the associated dynamic group is not at equilibrium;
a grouping execute logic that is configured to execute, upon determining the first request is a request by one of one or more services of grouping service, the first request by one of one or more services of grouping service,
the grouping service consisting of one of one or more services of subtraction service, addition service, accessory-driven service or presenting service; and
a control execute logic that is configured to execute the second request by changing the requested accessory characteristic state.

* * * * *